(12) United States Patent
Isaacson et al.

(10) Patent No.: US 8,666,973 B2
(45) Date of Patent: Mar. 4, 2014

(54) STRUCTURED RELEVANCE—A MECHANISM TO REVEAL HOW DATA IS RELATED

(75) Inventors: Scott A. Isaacson, Woodland Hills, UT (US); Kirk R. Kimball, South Jordan, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 13/033,490

(22) Filed: Feb. 23, 2011

(65) Prior Publication Data

US 2012/0215769 A1    Aug. 23, 2012

(51) Int. Cl.
*G06F 17/30*    (2006.01)
(52) U.S. Cl.
USPC ......................................................... 707/722
(58) Field of Classification Search
USPC .................. 707/722, 723, 730, 736, 737, 738
See application file for complete search history.

(56) References Cited

U.S. PATENT DOCUMENTS

2005/0065959 A1*  3/2005  Smith et al. ................... 707/102
2006/0047655 A1*  3/2006  Peter ................................. 707/6
2008/0306934 A1* 12/2008  Craswell et al. .................. 707/5
2011/0246438 A1* 10/2011  Sathish .......................... 707/706

OTHER PUBLICATIONS

Dantong Yu and Aidong Zhang, ClusterTree: Intergration of Cluster Representation and Nearest-Neighbor Search for Large Data Sets With High Dimensions, IEEE, vol. 15, No. 3, May/Jun. 2003.*

* cited by examiner

*Primary Examiner* — Robert Beausoliel, Jr.
*Assistant Examiner* — Hau H Hoang
(74) *Attorney, Agent, or Firm* — Schwegman Lundberg & Woessner, P.A.

(57) ABSTRACT

A machine receives a description of the relationships among members of a data set. The machine constructs a graph that represents the relationships among the members of the data set, organizing the members of the data set into groups. The groups are analyzed to determine their relative strengths. Unbalanced groups can be balanced by splitting off heavy sub-trees that include too large a percentage of the nodes in the group. The machine can then use the graph to answer queries about members of the data set.

16 Claims, 12 Drawing Sheets

STRUCTURED RELEVANCE—A MECHANISM TO REVEAL HOW DATA IS RELATED

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

RELATED APPLICATIONS

This application is related to U.S. patent application Ser. No. 12/568,190, filed Sep. 28, 2009, titled "OPTIMAL SEQUENTIAL (DE)COMPRESSION OF DIGITAL DATA", U.S. patent application Ser. No. 12/575,767, filed Oct. 8, 2009, 2009, titled "FAST APPROXIMATION TO OPTIMAL COMPRESSION OF DIGITAL DATA", U.S. patent application Ser. No. 12/616,306, filed Nov. 11, 2009, titled "DIGITAL SPECTRUM OF FILE BASED CONTENTS", U.S. patent application Ser. No. 12/649,584, filed Dec. 30, 2009, titled "OPTIMIZED PARTITIONS FOR GROUPING AND DIFFERENTIATING FILES OF DATA", U.S. patent application Ser. No. 12/649,688, filed Dec. 30, 2009, titled "STOPPING FUNCTIONS FROM GROUPING AND DIFFERENTIATING FILES BASED ON CONTENT", U.S. patent application Ser. No. 12/637,807, filed Dec. 15, 2009, titled "GROUPING AND DIFFERENTIATING FILES BASED ON CONTENT", and U.S. patent application Ser. No. 12/684,313, filed Jan. 8, 2010, titled "GROUPING AND DIFFERENTIATING VOLUMES OF FILES", all of which claim the benefit of U.S. Provisional Patent Application Ser. No. 61/271,079, filed Jul. 16, 2009 and U.S. Provisional Patent Application No. 61/236,571, filed Aug. 25, 2009, all of which are incorporated by reference.

FIELD

This invention pertains to organization of data, and more particularly to how data is grouped together based on content.

BACKGROUND

The Internet is an excellent resource for searching for information. Over the years, many different search engines have been designed to provide users with easy ways to search for data. Recent improvements in search engines include predictive searching, where the search engine predicts the user's search term based on what previous users have searched for that start with the same terms.

But the organization of the data returned as a result of a search is not an area that is well developed. Search engines return the data organized by what seems most likely to be desired by the user. While a reasonable strategy when the search term is fairly specific, this strategy does not work so well when the search terms are broad (either intentionally or accidentally). For example, a search for the term "Paris" could result in information relating to Paris, France (the city), Paris Hotel (the casino in Las Vegas, N.V.), or Paris Hilton (the socialite). Because it is likely that different users searching for the term "Paris" have intended all three targets, the results of a search for the term "Paris" will have results for all three targets intermixed. Thus, a user interested only in Paris, France would need to manually skip over entries relating to the casino and the socialite from the results. The situation becomes even more complicated when the user might be interested in combinations of the information: for example, information about the last time Paris Hilton stayed at the Paris Hotel. And even knowing how the data is grouped does not tell a person anything about why the data is grouped the way it is.

A need remains for a way to address these and other problems associated with the prior art.

SUMMARY

A machine can receive a description of relationships among the members of a data set. The machine can construct a graph representing these relationships, organized into groups, and determine the order, weight, and distance for each group. The machine can also refine the grouping of the members, based on various rules. The machine can then use the grouping of the members of the data set in response to a query.

The foregoing and other features, objects, and advantages of the invention will become more readily apparent from the following detailed description, which proceeds with reference to the accompanying drawings.

DETAILED DESCRIPTION

Before describing how the invention solves the problem of understanding how and why members of a data set are related, it is useful to understand a few example problems that the invention can solve:

A new employee at a company is given the task of inventorying a large data server. The employee is told that the server was used by a team that was recently disbanded, and that some key findings were in one version of a file, but there is a concern that those key findings had been deleted from a later version of the file. The files were shared by various team members and the names are not consistent and so it is impossible to tell from the file names if the files are different versions of each other. The employee is told to find all files that are related to each other and why. The employee is told to not only try to find versions of these specific known files but any other versions of any other files, since the CIO expects if they had this one problem, there might be other instances of the same problem in other files. In order to know that they versions of files without reading each entire file in each relevancy group, the employee needs to know how and why the data in each relevancy group is related.

Two companies are merged under somewhat hostile terms and one research teams resigns en masse. They leave their data, but no "baton passing" to understand what the data is and how it is structured and what it means. They have terabytes of data that remaining research teams need to comb through the data, not knowing exactly what the research teams are looking for. Tools exist to find related data, but then the research teams will want to know how and why the data is related.

A collaborative effort is underway by 5 different companies to find out why quality assurance metrics are recently down on their related manufacturing processes. They know that the end result is more failures in a specific material that is being manufactured, but they do not know why. They want to share their data with each other but they do not know exactly what they are looking for. Once they find related data, they want to know how and why it is related.

Figure 1:
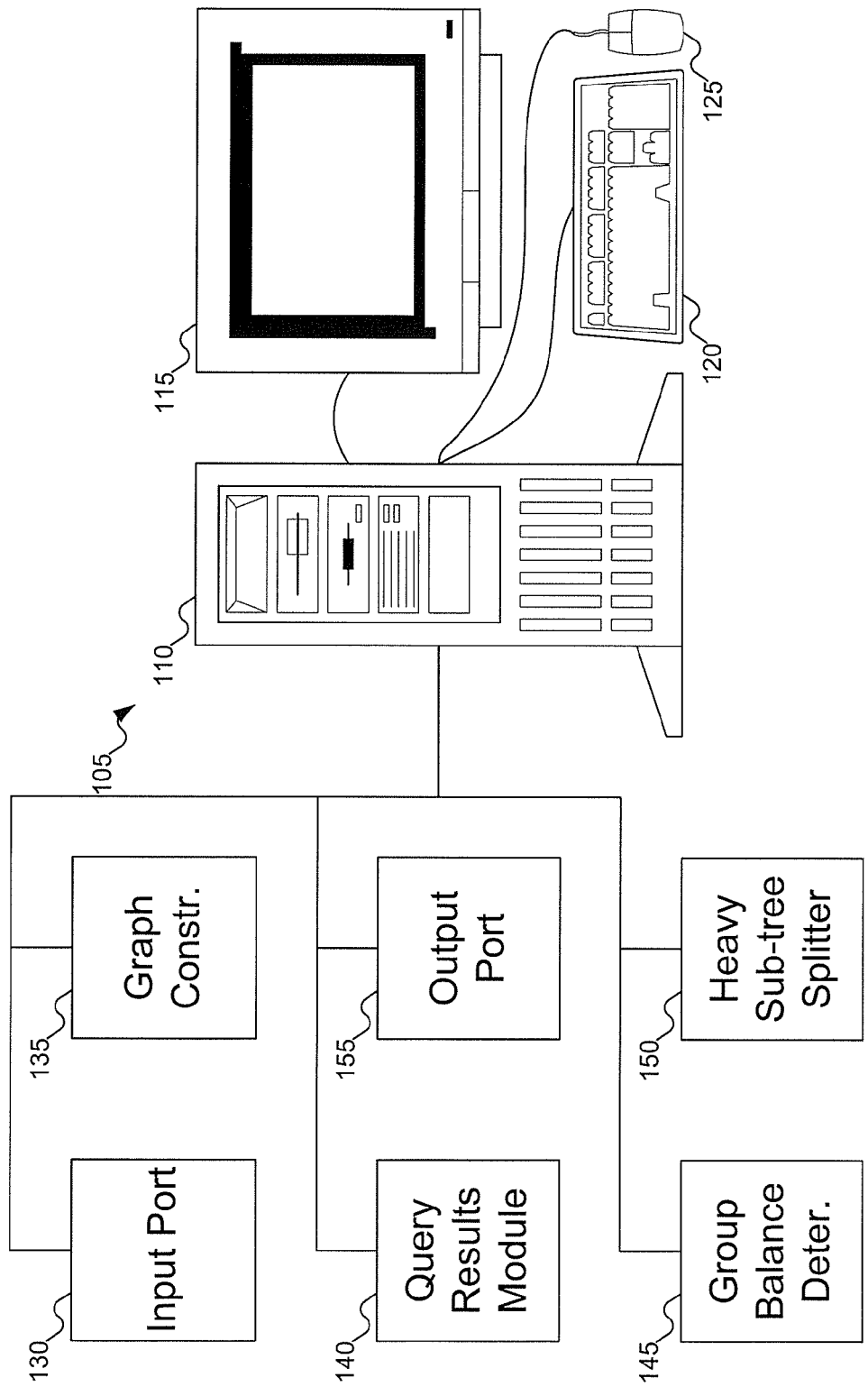
FIG. 1 shows a machine to determine how members of a data set are related, according to an embodiment of the invention.

Now that some example problems that show the need for understanding how and why data is related have been described, the solution can be explained. FIG. 1 shows a machine to determine how members of a data set are related, according to an embodiment of the invention. In FIG. 1, machine 105 is shown. Machine 105 can be any machine capable of determining how and/or why data is grouped in a particular way. Examples of forms machine 105 can take include servers, personal computers, mainframes, smart phones, and tablet computers, among other possibilities. Machine 105 can include computer 110, monitor 115, keyboard 120, and mouse 125. A person skilled in the art will recognize that other components not shown in FIG. 1 can be included with machine 105: for example, other input/output devices, such as a printer. In addition, FIG. 1 does not show some of the conventional internal components of machine 105; for example, a central processing unit, memory, storage, etc. Finally, although FIG. 1 shows machine 105 as a conventional desktop computer, a person skilled in the art will recognize that machine 105 can be any type of machine or computing device capable of providing the services attributed herein to machine 105, including, for example, a laptop computer, PDA, or a cellular telephone.

Machine 105 includes various components. Input port 130 is responsible for receiving information into machine 105. For example, input port 130 can receive information about how various members of a data set are related, which can be used to determine how and why the members of the data set are grouped in a particular manner. Input port 130 can also receive a query, which can be answered using information about the various members of the data set.

Graph constructor 135 is responsible for constructing a graph that represents the relationships among the members of the data set. This graph makes it possible to more easily understand how the members of the data set are grouped, and why.

Query results module 140 is responsible for processing a query and producing results for that query. These results can factor in how the members of the data set, over which the query applies, are related, making it easier to identify which members of the data set are most appropriate in response to the query.

Group balance determiner 145 provides additional functionality, in that there may be groups in the data set that are not well balanced. Assuming an unbalanced group can be found using group balance determiner 145, heavy sub-tree splitter 150 can be used to adjust the groups, splitting off heavy, or unbalanced, sub-trees to better balance the group.

Although FIG. 1 describes receiving information about how members of a single data set are related, a person of ordinary skill in the art will recognize that embodiments of the invention can be generalized to multiple data sets. That is, machine 105 can process information about how members of multiple data sets are related. Essentially, the multiple data sets can be subject to a union operation, creating a single data set including all the members of all the data sets, and machine 105 can then information about how the members of this single data set are related.

Figure 2:
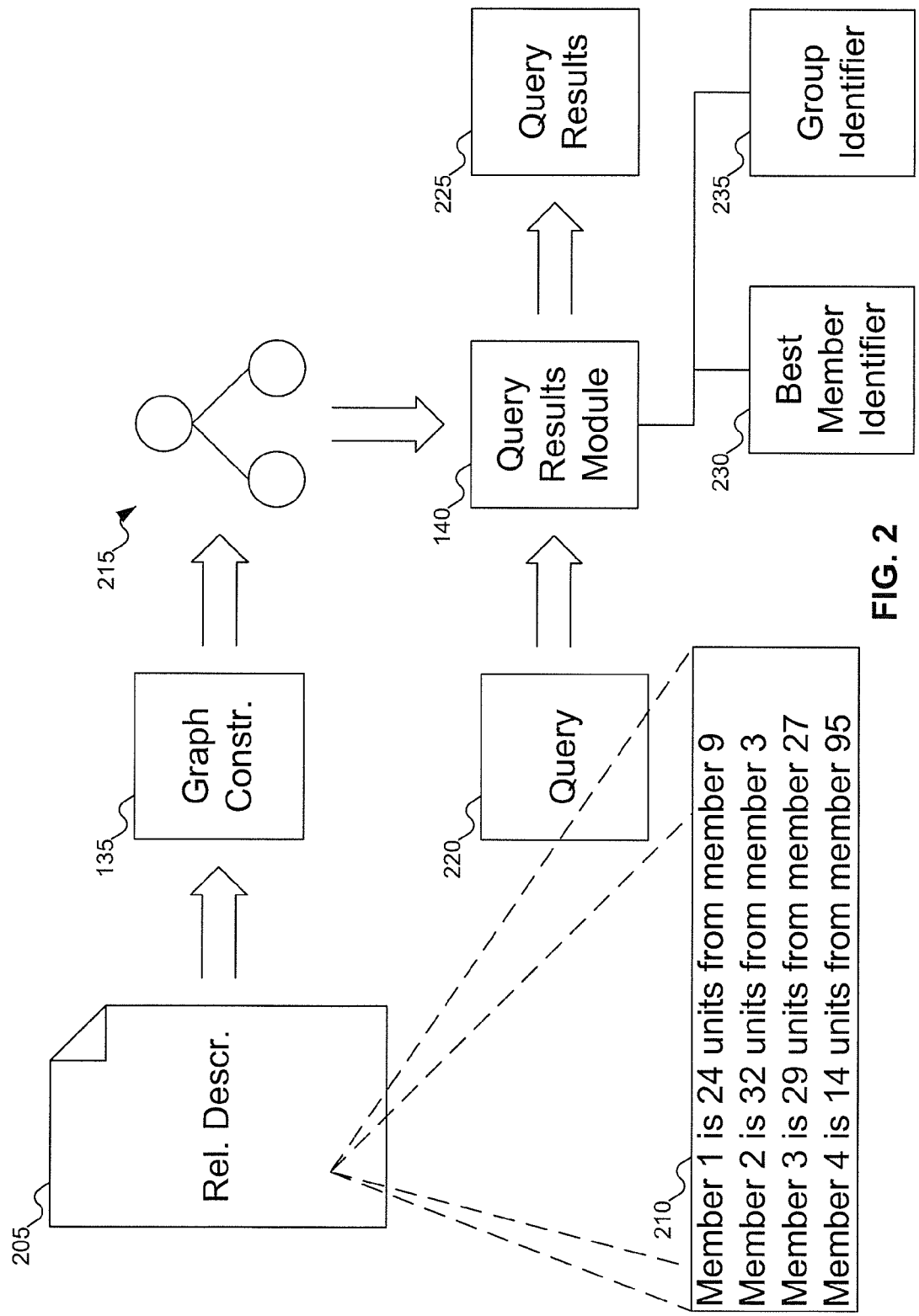
FIG. 2 shows how the machine of FIG. 1 can take descriptions of relationships among the members of a data set, construct a graph representing those relationships, and use the graph to respond to a query.

FIG. 2 shows how the machine of FIG. 1 can take descriptions of relationships among the members of a data set, construct a graph representing those relationships, and use the graph to respond to a query. In FIG. 2, the machine (not shown in FIG. 2) can receive relationship description 205, which describes relationships among the members of a data set. For example, relationship description 205 can specify, for each member of the data set, what other member of the data set is closest to that member, and the distance between that member and its closest neighbor. This description of relationships is shown in inset 210, which is a subset of the relationships described in Table 1.

TABLE 1

Member 0 is 12 units from member 37
Member 1 is 24 units from member 9
Member 2 is 32 units from member 3
Member 3 is 29 units from member 27
Member 4 is 14 units from member 95
Member 5 is 27 units from member 26
Member 6 is 23 units from member 27
Member 7 is 24 units from member 27
Member 8 is 11 units from member 73
Member 9 is 14 units from member 95
Member 10 is 4 units from member 11
Member 11 is 4 units from member 10
Member 12 is 13 units from member 11
Member 13 is 5 units from member 15
Member 14 is 4 units from member 15
Member 15 is 3 units from member 16
Member 16 is 3 units from member 15
Member 17 is 4 units from member 18
Member 18 is 4 units from member 17
Member 19 is 25 units from member 27
Member 20 is 27 units from member 27
Member 21 is 25 units from member 27
Member 22 is 25 units from member 80
Member 23 is 28 units from member 27
Member 24 is 24 units from member 27
Member 25 is 27 units from member 88
Member 26 is 12 units from member 29
Member 27 is 13 units from member 26
Member 28 is 25 units from member 59
Member 29 is 12 units from member 26

TABLE 1-continued

Member 30 is 22 units from member 27
Member 31 is 29 units from member 27
Member 32 is 29 units from member 27
Member 33 is 19 units from member 27
Member 34 is 26 units from member 33
Member 35 is 19 units from member 66
Member 36 is 13 units from member 73
Member 37 is 13 units from member 0
Member 38 is 19 units from member 27
Member 39 is 20 units from member 27
Member 40 is 27 units from member 27
Member 41 is 34 units from member 27
Member 42 is 26 units from member 43
Member 43 is 26 units from member 42
Member 44 is 27 units from member 42
Member 45 is 24 units from member 46
Member 46 is 24 units from member 45
Member 47 is 20 units from member 27
Member 48 is 15 units from member 51
Member 49 is 28 units from member 51
Member 50 is 20 units from member 51
Member 51 is 15 units from member 48
Member 52 is 12 units from member 54
Member 53 is 30 units from member 68
Member 54 is 12 units from member 52
Member 55 is 25 units from member 71
Member 56 is 8 units from member 57
Member 57 is 8 units from member 58
Member 58 is 8 units from member 57
Member 59 is 9 units from member 58
Member 60 is 20 units from member 27
Member 61 is 21 units from member 63
Member 62 is 24 units from member 59
Member 63 is 20 units from member 59
Member 64 is 18 units from member 70
Member 65 is 16 units from member 71
Member 66 is 14 units from member 71
Member 67 is 16 units from member 68
Member 68 is 13 units from member 71
Member 69 is 16 units from member 68
Member 70 is 17 units from member 68
Member 71 is 13 units from member 68
Member 72 is 19 units from member 64
Member 73 is 12 units from member 8
Member 74 is 26 units from member 77
Member 75 is 29 units from member 74
Member 76 is 27 units from member 74
Member 77 is 26 units from member 74
Member 78 is 29 units from member 74
Member 79 is 20 units from member 27
Member 80 is 19 units from member 27
Member 81 is 21 units from member 27
Member 82 is 22 units from member 81
Member 83 is 20 units from member 80
Member 84 is 21 units from member 27
Member 85 is 22 units from member 84
Member 86 is 12 units from member 37
Member 87 is 23 units from member 11
Member 88 is 18 units from member 26
Member 89 is 21 units from member 59
Member 90 is 24 units from member 59
Member 91 is 28 units from member 59
Member 92 is 23 units from member 27
Member 93 is 21 units from member 27
Member 94 is 20 units from member 27
Member 95 is 15 units from member 4

A person of ordinary skill in the art will recognize that the "closest" relationship, which can also be called a "nearest neighbor" relationship, depends on the data in the member itself, and thus is not necessarily a symmetrical relationship, nor is the relationship based on a calculated distance between the members. That is, just because member B is the nearest neighbor of member A does not automatically imply that member A is the nearest neighbor of member B. For example, it could happen that member B is the nearest neighbor of member A, but member C is the nearest neighbor of member B. Further, it could happen that the distance between members A and B is less than the distance between members B and C.

This non-symmetrical relationship can lead to some unusual results. For example, it is theoretically possible that member B is closest to member A, member C is closest to member B, and member A is closes to member C, which would seem to be a contradictory result. But empirical testing has not encountered this situation: as discussed below with reference to FIG. 3, every group in empirical testing has had a core of two members. For purposes of this discussion, a "core" (or "core group") is a set of members of the data set such that there is a path from any member of the data set in the core to each other member of the data set in the core, traversing via the nearest neighbor links. Put another way, the core consists of a set of members of the data set form a cycle.

There are several technologies available today that can provide information about the relationships among various members. For example, U.S. patent application Ser. No. 12/568,190, filed Sep. 28, 2009, titled "OPTIMAL SEQUENTIAL (DE)COMPRESSION OF DIGITAL DATA", U.S. patent application Ser. No. 12/575,767, filed Oct. 8, 2009, 2009, titled "FAST APPROXIMATION TO OPTIMAL COMPRESSION OF DIGITAL DATA", U.S. patent application Ser. No. 12/616,306, filed Nov. 11, 2009, titled "DIGITAL SPECTRUM OF FILE BASED CONTENTS", U.S. patent application Ser. No. 12/649,584, filed Dec. 30, 2009, titled "OPTIMIZED PARTITIONS FOR GROUPING AND DIFFERENTIATING FILES OF DATA", U.S. patent application Ser. No. 12/649,688, filed Dec. 30, 2009, titled "STOPPING FUNCTIONS FROM GROUPING AND DIFFERENTIATING FILES BASED ON CONTENT", U.S. patent application Ser. No. 12/637,807, filed Dec. 15, 2009, titled "GROUPING AND DIFFERENTIATING FILES BASED ON CONTENT", and U.S. patent application Ser. No. 12/684,313, filed Jan. 8, 2010, titled "GROUPING AND DIFFERENTIATING VOLUMES OF FILES", all of which are incorporated by reference herein, are patent applications that describe ways of determining relationships among members of a data set. But a person skilled in the art will recognize that there are other ways in which to determine relationships between members of a data set. For example, U.S. patent application Ser. No. 09/109,804, filed Jul. 2, 1998, titled "METHOD AND APPARATUS FOR SEMANTIC CHARACTERIZATION OF GENERAL CONTENT STREAMS AND REPOSITORIES", now U.S. Pat. No. 6,108,619, issued Aug. 22, 2000, U.S. patent application Ser. No. 09/512,963, filed Feb. 25, 2000, titled "CONSTRUCTION, MANIPULATION, AND COMPARISON OF A MULTI-DIMENSIONAL SEMANTIC SPACE", now U.S. Pat. No. 7,152,031, issued Dec. 19, 2006, U.S. patent application Ser. No. 09/615,726, filed Jul. 13, 2002, titled "METHOD AND MECHANISM FOR THE CREATION, MAINTENANCE, AND COMPARISON OF SEMANTIC ABSTRACTS", now U.S. Pat. No. 7,197,451, issued Mar. 27, 2007, U.S. patent application Ser. No. 09/653,713, filed Sep. 5, 2000, titled "INTENTIONAL STANCE CHARACTERIZATION OF A GENERAL CONTENT STREAM OR REPOSITORY", now U.S. Pat. No. 7,286,977, issued Oct. 23, 2007, U.S. patent application Ser. No. 09/691,629, filed Oct. 18, 2000, titled "METHOD AND MECHANISM FOR SUPERPOSITIONING STATE VECTORS IN A SEMANTIC ABSTRACT", now U.S. Pat. No. 7,389,225, issued Jun. 17, 2008, U.S. patent application Ser. No. 09/654,660, filed Sep. 5, 2000, titled "POLICY ENFORCEMENT USING THE SEMANTIC CHARACTERIZATION OF TRAFFIC", now U.S. Pat. No. 7,177,922, issued Feb. 13, 2007, U.S.

patent application Ser. No. 09/710,027, filed Nov. 7, 2000, titled "DIRECTED SEMANTIC DOCUMENT PEDIGREE", now abandoned, U.S. patent application Ser. No. 11/554,476, filed Oct. 30, 2006, titled "INTENTIONAL-STANCE CHARACTERIZATION OF A GENERAL CONTENT STREAM OR REPOSITORY", now U.S. Pat. No. 7,562,011, issued Jul. 14, 2009, U.S. patent application Ser. No. 11/616,154, filed Dec. 26, 2006, titled "SYSTEM AND METHOD OF SEMANTIC CORRELATION OF RICH CONTENT", now U.S. Pat. No. 7,672,952, issued Mar. 2, 2010, U.S. patent application Ser. No. 11/562,337, filed Nov. 21, 2006, titled "CONSTRUCTION, MANIPULATION, AND COMPARISON OF A MULTI-DIMENSIONAL SEMANTIC SPACE", now U.S. Pat. No. 7,475,008, issued Jan. 6, 2009, U.S. patent application Ser. No. 11/563,659, filed Nov. 27, 2006, titled "METHOD AND MECHANISM FOR THE CREATION, MAINTENANCE, AND COMPARISON OF SEMANTIC ABSTRACTS", now U.S. Pat. No. 7,653,530, issued Jan. 26, 2010, and U.S. patent application Ser. No. 11/929,678, filed Oct. 3, 2007, titled "CONSTRUCTION, MANIPULATION, AND COMPARISON OF A MULTI-DIMENSIONAL SEMANTIC SPACE", now allowed, (6647-0100), all of which are incorporated by reference herein, describe ways to characterize semantic content, and could be the basis for determining relationships between members of a data set.

Returning to FIG. 2, graph constructor 135 takes the description of relationships 205, and uses them to produce graph 215, which graphically represents the relationships between the members of the data set. While FIG. 2 shows graph 215 as a simple graph with only three nodes in a tree structure, a person of ordinary skill in the art will recognize that the graph can have any number of nodes (normally, one node for each member of the data set), and does not have to be in a tree structure. In fact, as discussed below with reference to FIG. 3, the graph does not even require that each pair of nodes be connected by some path. Instead, the nodes can be grouped together, so that nodes in one group are not connected to nodes in another group.

Query results module 140 can take graph 215 and query 220 and produce query results 225, which is the results of the query as applied to the data set. To that end, query results module 140 can include a best member identifier 230 that identifies the member of the data set that best responds to the query, and group identifier 235, which identifies the group to which the best member belongs. In this manner, other members of that group can be positioned as more responsive to the query than members of the data set that are in another group.

Figure 3:
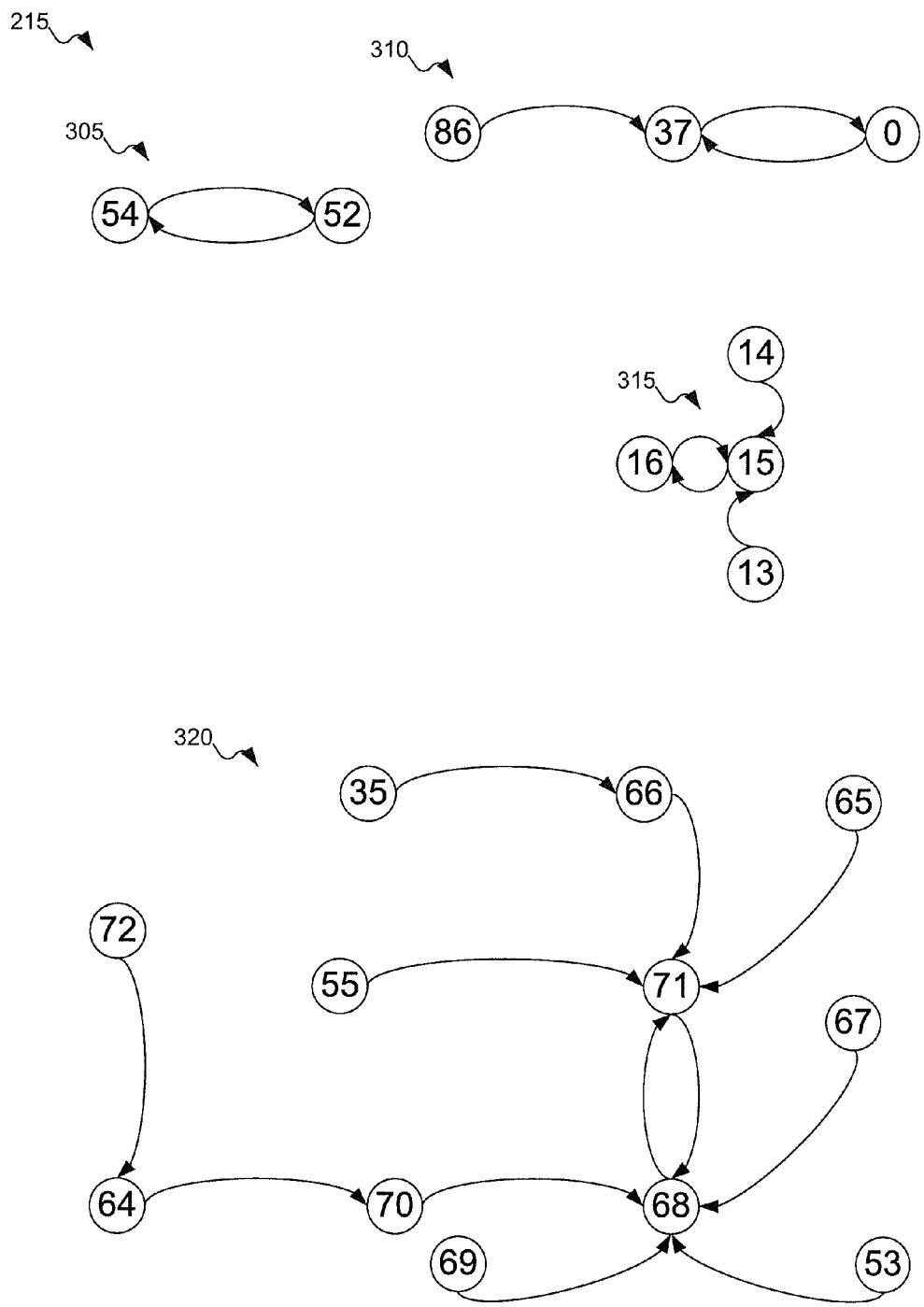
FIG. 3 shows an example of various groups in the graph of the members of the data set produced by the machine of FIG. 1.

FIG. 3 shows an example of various groups in the graph of the members of the data set produced by the machine of FIG. 1. In FIG. 3, several groups are shown from graph 215. As only a subset of the nodes are shown (for example, FIG. 3 does not show nodes 1-11, 16-33, 35, 37-43, 45-50, 54-62, 70, 73-84, and 86-95 (assuming that the nodes are numbered sequentially to represent members of the data set described in Table 1), a person of ordinary skill in the art will recognize that there are several other groups not shown in graph 215. A person of ordinary skill in the art will also recognize that the distances shown in FIG. 3 between nodes in groups is approximate, and the graph is not necessarily representative of the true distances between nodes.

Looking at graph 215, a few features are apparent. First, group 305 is the smallest of the groups shown. It includes only two members (nodes 52 and 54), each of which is the nearest neighbor of the other. In fact, in each of groups 305, 310, 315, and 320, there are two nodes that are each other's nearest neighbors. As mentioned above with reference to FIG. 2, there is nothing that requires each group in graph 215 to have two nodes, each of which is the nearest neighbor to the other. But empirical results have shown that this rule, if not always true, is true most of the time. For purposes of further discussion, this set of nodes within a group, where each node is the nearest neighbor of the other, is called a "core".

Groups 310, 315, and 320 become progressively more complex. Group 310 includes a core with nodes 0 and 37, group 315 includes a core with nodes 15 and 16, and group 320 includes a core with nodes 68 and 71. Group 310 includes one additional node (node 86); group 315 includes two additional nodes (13 and 14); and group 320 includes 10 additional nodes (nodes 35, 55, 53, 64, 65, 66, 67, 69, 70, and 72).

For each group, a strength can be defined. The strength of a group is combination of the group's order, weight, and distance. The order of a group is the number of nodes in the group. The weight of a group is the depth of the deepest sub-tree in the group: that is, the maximum number of hops that need to be made from any node in the group to reach the core. And the distance of a group is the average of the distances from each node to its nearest neighbor. A person of ordinary skill in the art will understand that the term "average" means (mathematically) the mean of the distances. But a person of ordinary skill in the art will also recognize that an alternative method for calculating an "average" can used. For example, the "average" can be a weighted average, using a weight for each distance. Or, the "average" can be a geometric average. Or, the "average" can be (mathematically) the median or mode of the distances. A person of ordinary skill in the art will recognize other possible "averages" that can be used.

For each of the order, weight, and distance, a smaller number indicates a stronger group. The strength of the group can be represented as a vector that includes these three values, where the order is more significant than the weight, and the weight is more significant than the distance. Table 2 shows the strengths of the groups shown in FIG. 3:

TABLE 2

| Group: | Order: | Weight: | Distance: | Strength: | | |
|---|---|---|---|---|---|---|
| group 305 | 2 | 0 | 12 | <2, | 0, | 12> |
| group 310 | 3 | 1 | 12.33 | <3, | 1, | 12.33> |
| group 315 | 4 | 1 | 3.75 | <4, | 1, | 3.75> |
| group 320 | 12 | 3 | 17.17 | <12 | 3, | 17.17> |

A few facts can be seen from Table 2. First, the strongest group is group 305, as it has the smallest order. In addition, as group 305 is a core group (that is, it includes no nodes that are not part of the core), group 305 is considered stronger than non-core groups (that is, groups that include nodes that are not part of the core of the group). If there are multiple core groups (which can happen), then they would all have the same order (assuming the empirical results that cores have only two nodes holds true) and weight, which means that core groups can be compared by their distances. Assuming the orders of the groups were equal, then group 305 would be stronger than groups 310, 315, and 320 (because it has a smaller weight). Groups 310 and 315 have equal weight; if they also had equal order, then the distance would determine which group is stronger (group 315 would be considered stronger, because it has a smaller average distance between nodes).

Group 320 is an interesting group, in that it has seven nodes (nodes 53, 55, 65, 66, 67, 69, and 70) that have the core as their nearest neighbor. Each of these nodes is the root of a true sub-tree: there is no core group within any of the sub-trees. Only two of the sub-trees (rooted at nodes 66 and 70) have any nodes linked to them. The depth of group 320 is determined from node 72, which is linked to the core via nodes 64 and 70 (a total of three hops to reach the core): no node is further from the core than node 72.

Groups 305, 310, 315, and 320 are all relatively small, and appear to be balanced. A group is considered unbalanced if it includes a sub-tree that includes an excessive percentage of the total nodes in the group. Unbalanced groups tend to be weaker than balanced groups, and thus there is reason to attempt to improve the graph by balancing the group. Empirical testing has determined that a usable threshold percentage of nodes to unbalance a group is 50-60%: that is, if a sub-tree of the group includes more than 50-60% of the nodes in the group, then the group is considered unbalanced. Looking at group 320, for example, the largest sub-tree is the sub-tree rooted at node 70, which includes a total of three nodes. As the group as a whole has 12 nodes, this sub-tree only has 25% of the nodes, and the group is considered balanced. A person of ordinary skill in the art will recognize that the threshold percentage can be set to any desired level, and that the suggested threshold percentage of 50-60% is only a suggestion.

When a group is unbalanced, the sub-tree that has unbalanced the group can be split off from the group, and made into its own group. Obviously, this new group will not have a core, making it a non-core group. Non-core groups are considered weaker than core groups, without regard to the relative order, weight, or distance of the groups. A person of ordinary skill in the art will recognize that the remainder of the original group might remain unbalanced: based on its new weight, there might be a remaining sub-tree that again unbalances the group, in which case the group might again require a heavy sub-tree to be split off. But the overall graph is better balanced as a result.

Figure 4:
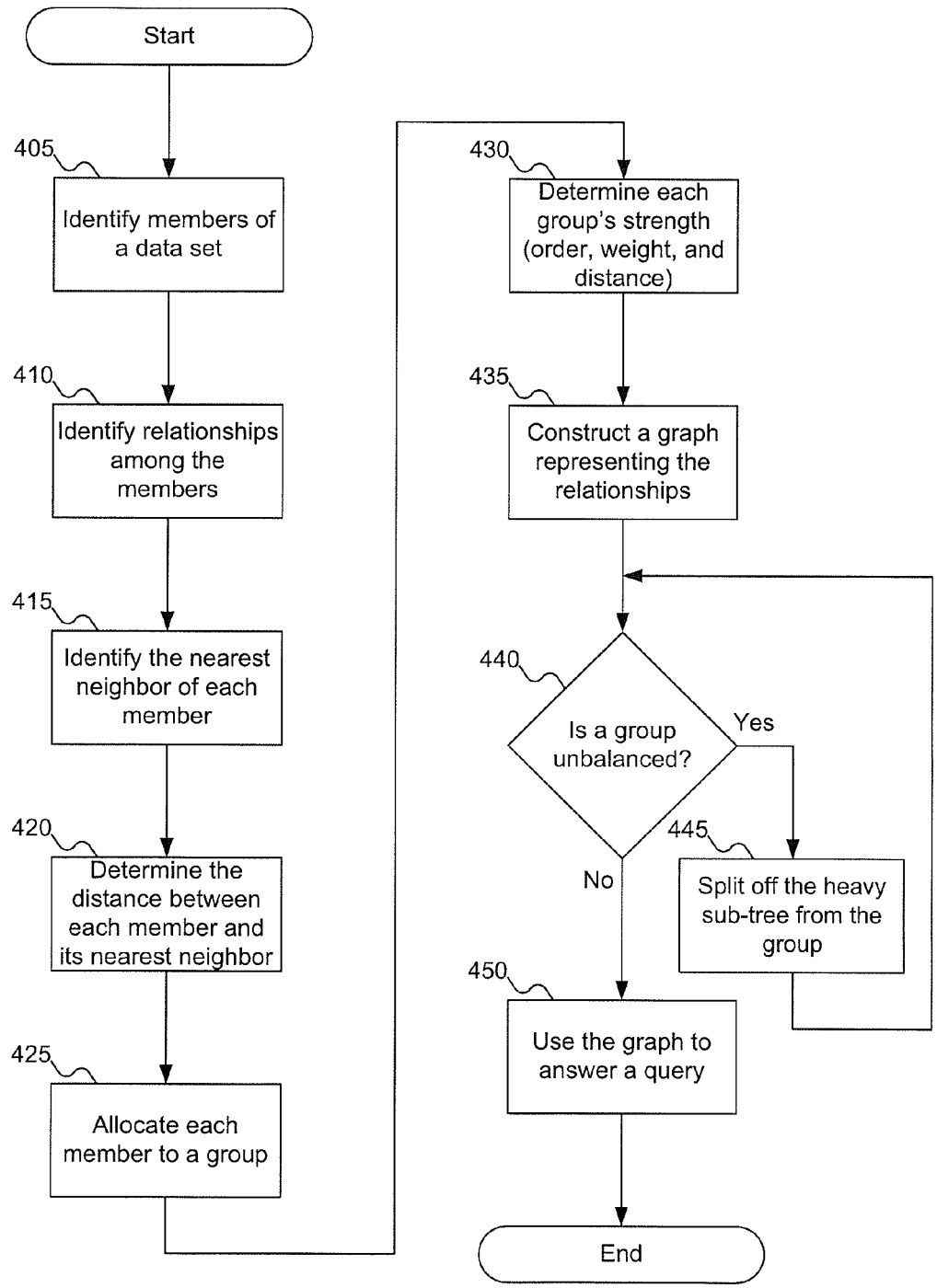
FIG. 4 shows a flowchart of a procedure for constructing a graph representing the relationships among members of a data set, according to an embodiment of the invention.

FIG. 4 shows a flowchart of a procedure for constructing a graph representing the relationships among members of a data set, according to an embodiment of the invention. In FIG. 4, at block 405, the system identifies the members of a data set. The data set itself can be defined independently of embodiments of the invention; thus, the "identification" of the members of the data set can be independent of embodiments of the invention. At block 410, the system identifies relationships among the members of the data set. As discussed above, any desired technology can be used to determine the relationships among the members of the data set; how the relationships among the members of the data set are determined is independent of embodiments of the invention.

At block 415, the system identifies the nearest neighbor of each member. At block 420, the system determines the distance between a member and its nearest neighbor. At block 425, the system allocates each member to a group, based on its nearest neighbor. At block 430, the system determines each group's strength (that is, each group's order, weight, and distance). At block 435, the system constructs a graph representing the members of the data set and their relationships.

At block 440, the system determines if there is a group that is unbalanced. If a group is unbalanced, then at block 445, the system splits off a heavy sub-tree from the group. Control then returns to block 440 to check for another unbalanced group. Otherwise, at block 450 the system can use the graph to answer a query about the members of the data set.

Figure 5:
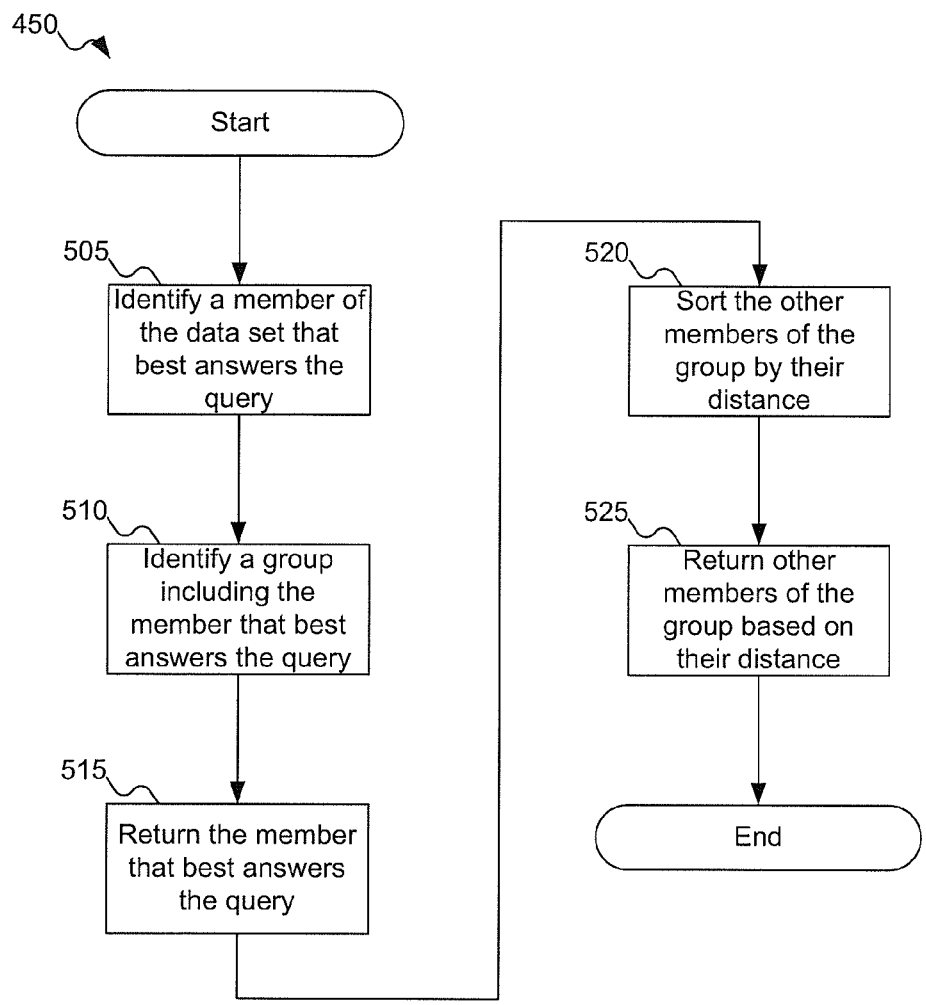
FIG. 5 shows a flowchart of a procedure to use the graph representing the relationships among members of a data set to respond to a query, according to an embodiment of the invention.

FIG. 5 shows a flowchart of a procedure to use the graph representing the relationships among members of a data set to respond to a query, according to an embodiment of the invention. In FIG. 5, at block 505, the system identifies a member of the data set that best answers the query. At block 510, the system identifies the group that includes the member of the data set that best answers the query. At block 515, the system returns the member of the data set that best answers the query. At block 520, the system sorts the other members of the group that includes the member that best answers the query, according to their distance from the member that best answers the query. At block 525, the system returns other members of the group that includes the member that best answers the query, based on their distance from the member that best answers the query.

Figure 6:
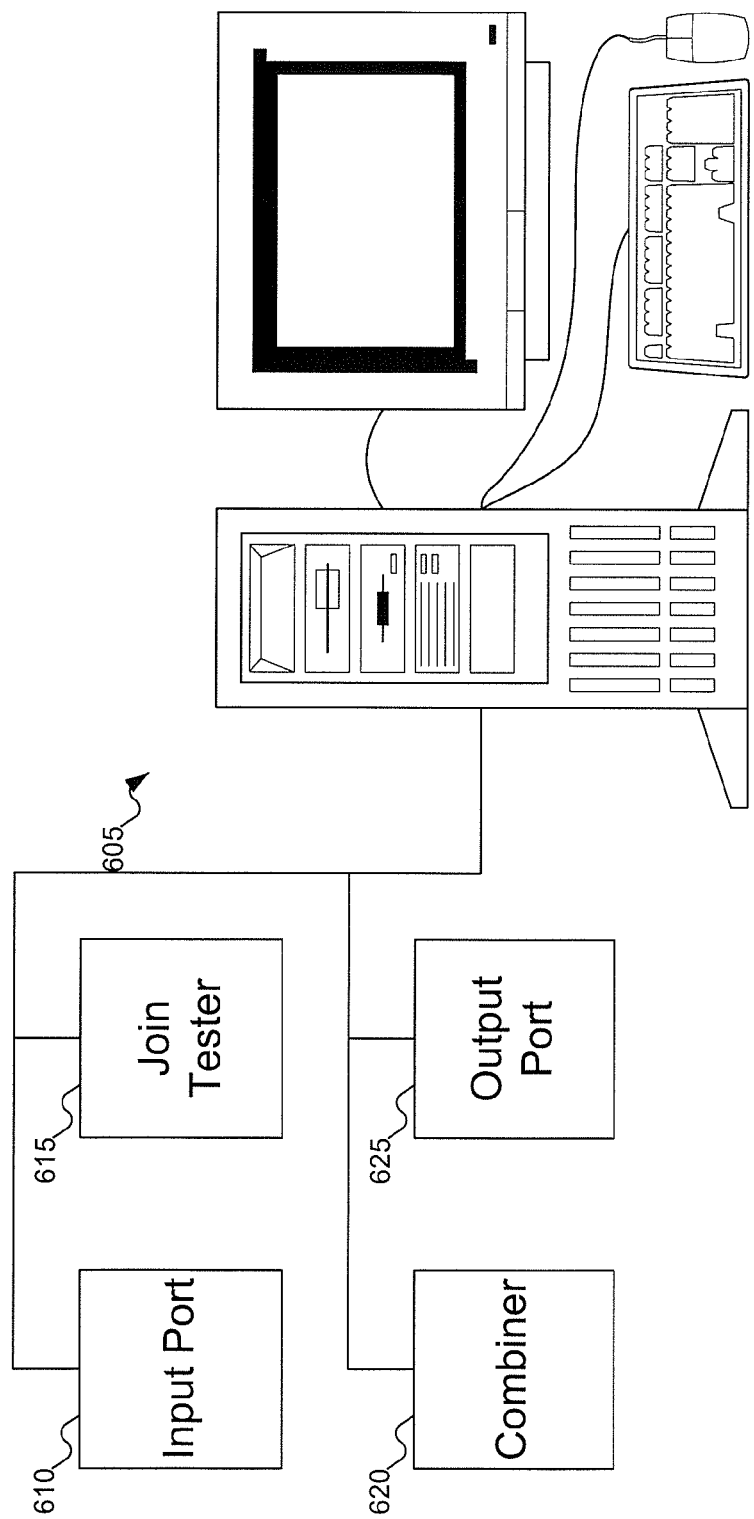
FIG. 6 shows a machine that can join groups in the graph representing the relationships among members of a data set, according to an embodiment of the invention.

FIG. 6 shows a machine that can join groups in the graph representing the relationships among members of a data set, according to an embodiment of the invention. Machine 605 is similar to machine 105 of FIG. 1: machine 605 can also be combined with machine 105, to provide multiple functionalities.

Machine 605 includes various components. Input port 610 is responsible for receiving groupings of members of data sets, as determined by different sources. For example, two different users might independently process a data set as described in FIGS. 1-5, but using different methodologies, resulting in different groupings. Or, different users might process different data sets (using either the same of different methodologies), that now need to be combined. Input port 610 can receive these graphs from the different users.

Join tester 615 is responsible for testing whether it is beneficial to join particular sets of groups from the two users. In general, the same number of groups are taken from each user's graph and combined, or merged, to form a single new group. The combined group can then be analyzed using the methodologies discussed above to determine relationships among the members of the group. Join tester 615 can work with one group at a time from each user, or with multiple groups from each user.

To test whether the combined group is stronger than the individual groups from the users, join tester 615 can determine the strength (that is, the order, weight, and distance) of the potential combined group. If the strength of the potential combined group is stronger than the sum of the strengths of the individual groups, then combiner 620 combines, or merges, the groups from the individual users into a merged group, which is added to the graph; the original individual groups are removed from the respective user's graphs.

Output port 625 is responsible for outputting the result of merging any groups, to produce a final graph, merging the data from the two original graphs.

Figure 7:
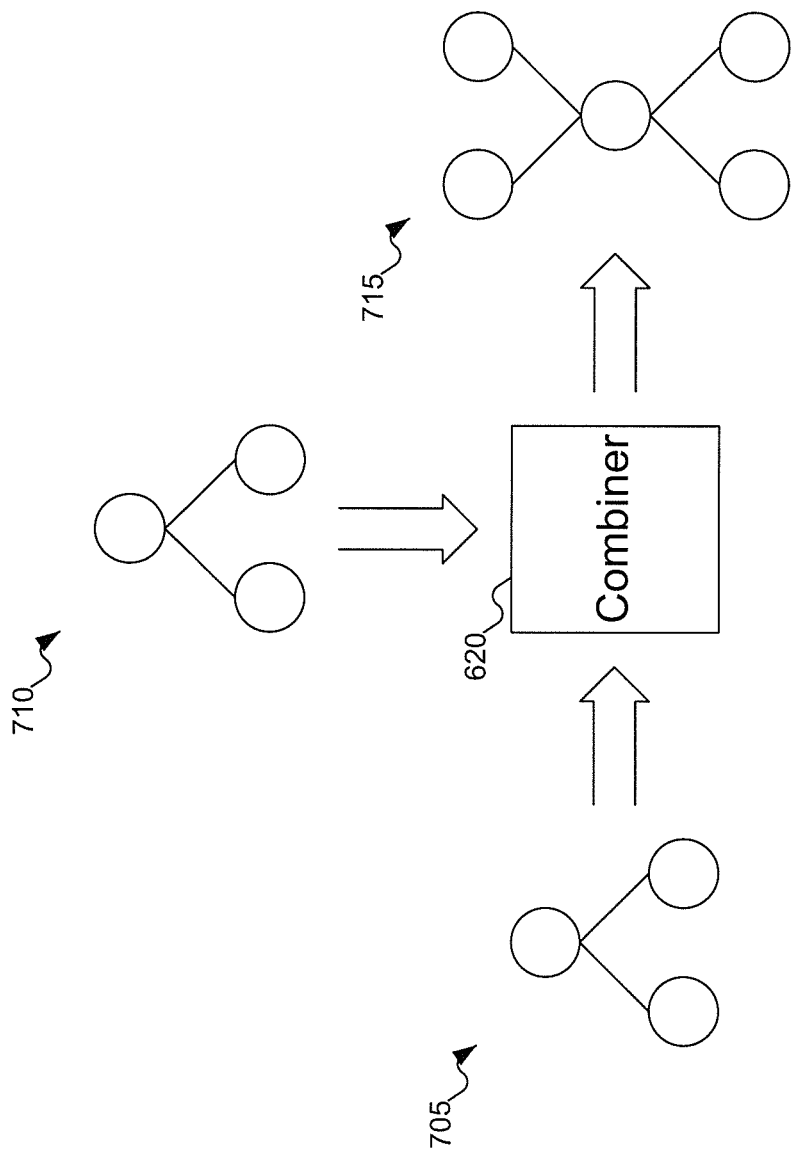
FIG. 7 shows an example of two groups being joined by the machine of FIG. 6.

FIG. 7 shows an example of two groups being joined by the machine of FIG. 6. In FIG. 7, combiner 520 is shown receiving groups 705 and 710 from different users, and producing combined group 715 instead. A person of ordinary skill in the art will recognize that groups 705, 710, and 715, although represented using the same symbol as graph 215 of FIG. 2, are not intended to necessarily be the same as group 215 of FIG. 2.

Figure 8:
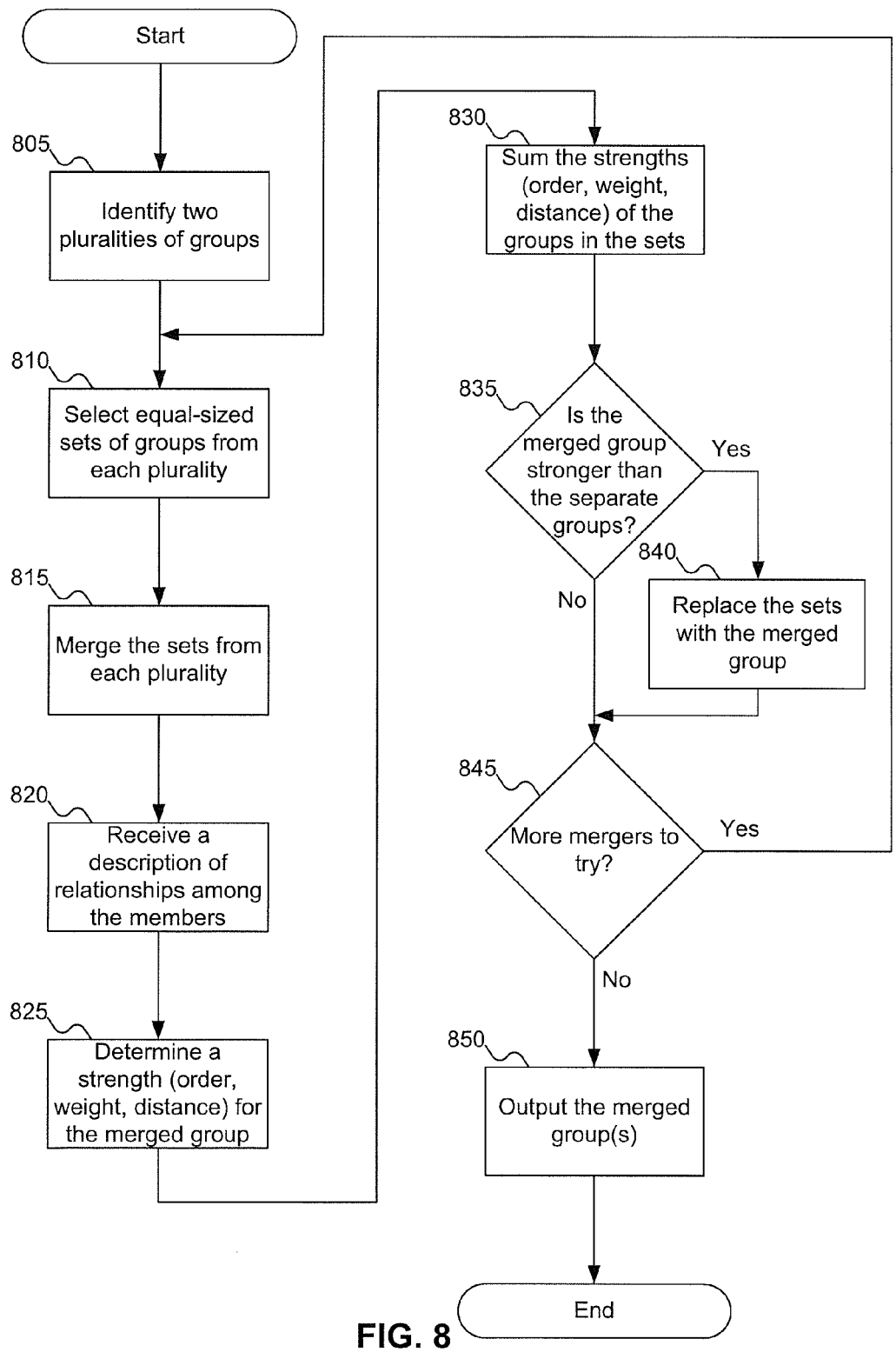
FIG. 8 shows a flowchart of a procedure to join groups in the graph representing the relationships among members of a data set, according to an embodiment of the invention.

FIG. 8 shows a flowchart of a procedure to join groups in the graph representing the relationships among members of a data set, according to an embodiment of the invention. In FIG. 8, at block 805, the system identifies two pluralities of groups: that is, two graphs from data analysis performed by users. At block 810, the system identifies sets of groups from each graph, where each set has the same number of members. At block 815, the system merges the sets of groups. At block 820, the system receives a description of the relationships among the members of the merged group. At block 825, the system determines a strength (that is, order, weight, and distance) for the merged group. At block 830, the system determines the sum of the strengths of the groups in the selected sets.

At block 835, the system compares the strength of the merged group with the summed strengths of the individual groups. If the merged group is stronger, then at block 840 the system replaces the individual groups with the merged group. Either way, at block 845, the system determines if there are more mergers to try. If so, then control returns to block 810 to try more mergers. Otherwise, at block 850, the system outputs the resulting graph, including the merged groups.

Figure 9:
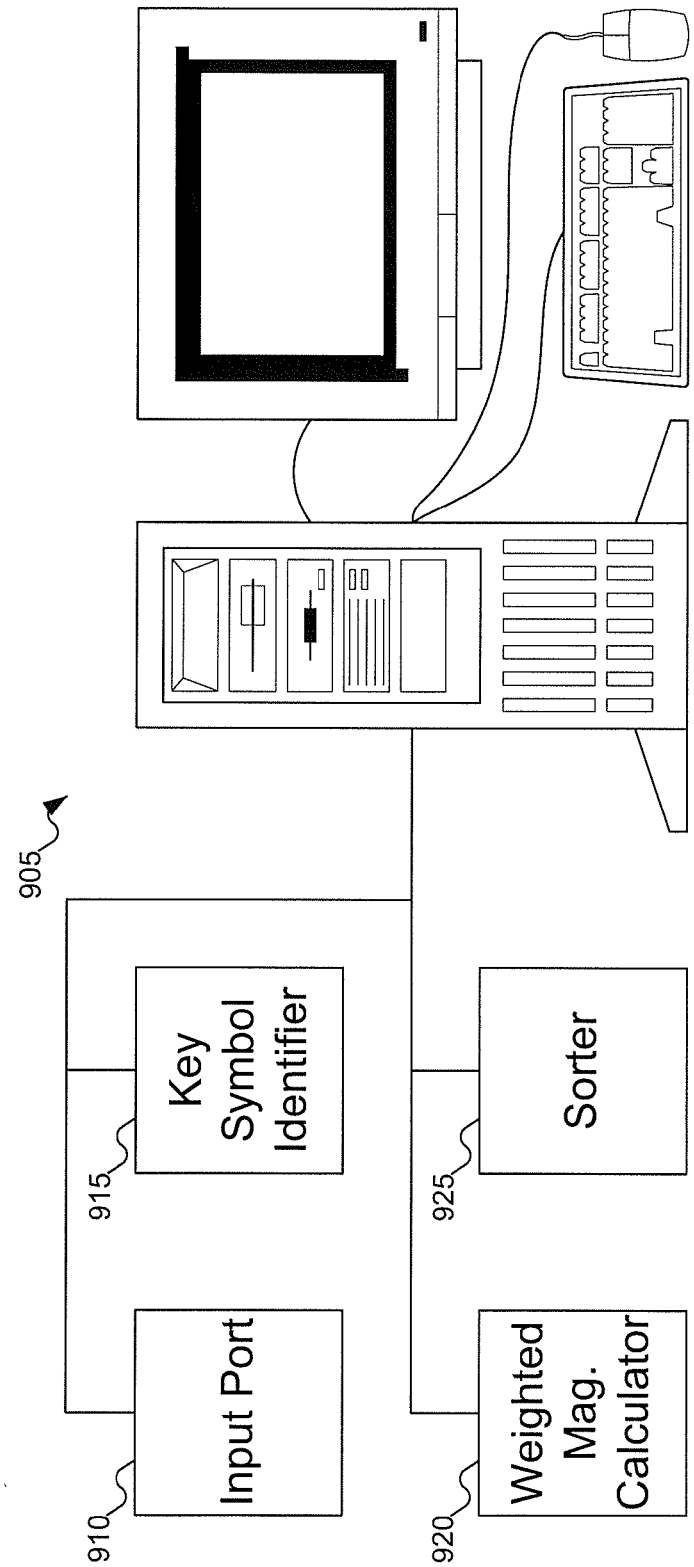
FIG. 9 shows a machine that can determine why members of a data set a related, according to an embodiment of the invention.

FIG. 9 shows a machine that can determine why members of a data set a related, according to an embodiment of the invention. Machine 905 is similar to machine 105 of FIG. 1 and machine 605 of FIG. 6: machine 1405 can also be combined with machines 105 and 605, to provide multiple functionalities.

Machine 905 includes various components. Input port 910 is responsible for receiving a group of members of a data set. Key symbol identifier 915 is responsible for identifying key symbols in the members of the group. Key symbols are basically all symbols used in the members of the group, without regard to "common" symbols. For example, if the members of the data set are documents written in English, the key symbols include symbols such as "a", "an", "the", "is", and various other common words that are likely to be found in all documents.

Weighted magnitude calculator 920 is responsible for calculating the weighted magnitude for each key symbol identified by key symbol identifier 915, within the group. And sorter 925 is responsible for sorting the key symbols based on their weighted magnitude. As described below, this sorting can be used to provide a name for the group.

Figure 10:
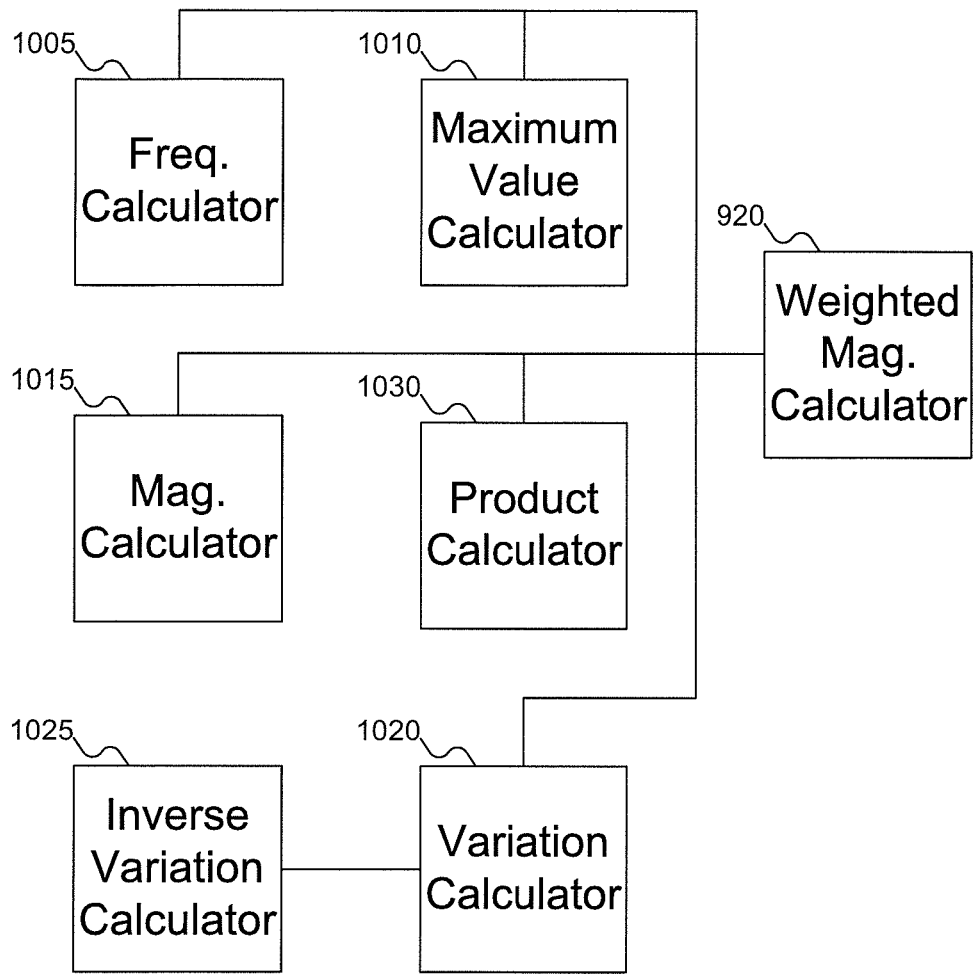
FIG. 10 shows details about the weighted magnitude calculator of FIG. 9.

FIG. 10 shows details about the weighted magnitude calculator of FIG. 9. In FIG. 10, weighted magnitude calculator 920 includes frequency calculator 1005, which determines a frequency for each key symbol in each a given member of the group. Each key symbol's frequency is relative to all symbols in that member of the group. When put in sequence in a vector, the frequency of each key symbol in the member of the group forms a digital essence vector for the member of the group.

Maximum value calculator 1010 determines the maximum frequency of all key symbols in all members of the group. Magnitude calculator 1015 determines the magnitude of each key symbol. The magnitude of the key symbol is the sum of the frequencies of the key symbol from each member of the group, divided by the number of members in the group multiplied by the maximum value for any key symbol.

Variation calculator 1020 determines the variation of the key symbol. The variation of the key symbol measures the difference between the frequency of the key symbol in a particular member of the group relative to all key symbol frequencies in all members of the group. That is, the variation is calculated by determining the absolute value of the difference between the frequency of the key symbol in that document and the frequency of every other value in every other digital essence vector in the group. The absolute values of these differences can then be summed and normalized by dividing the sum by (n*(n−1))/2 times the maximum value for any key symbol, where n is the number of members in the group. Variation calculator 1020 can also calculate the inverse variation, which is the difference between the maximum value for any key symbol and the variation, using inverse variation calculator 1025. Calculating and using the inverse variation (as opposed to the standard variation) means that the calculated weighted magnitudes for the key symbols have their ordinary interpretation: that is, a larger weighted magnitude implies a more important key symbol. But a person of ordinary skill in the art will recognize that the weighted magnitude can be calculated using the standard variation, in which case smaller values are considered more significant.

Finally, product calculator 1030 determines the weighted magnitude by multiplying the magnitude, as determined by magnitude calculator 1015, with the inverse variation, as determined by inverse variation calculator 1025.

The above description assumes that all the members of the data set are part of a single relevancy group. But as discussed above, there can be multiple relevancy groups for a single data set. In that case, the magnitude, variation, and weighted magnitude (and inverse variation) can be calculated based only on the members of a particular relevancy group (although the maximum value can be calculated across all members of the data set).

Figure 11:
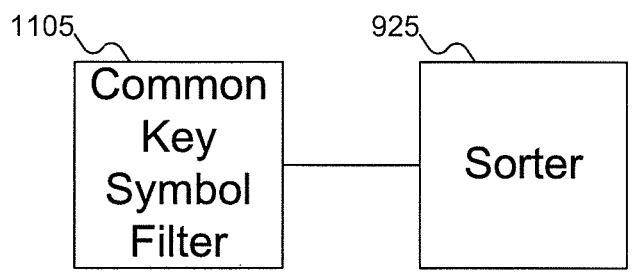
FIG. 11 shows details about the sorter of FIG. 9.

FIG. 11 shows details about the sorter of FIG. 9. In FIG. 11, sorter 925 includes common key symbol filter 1105. Common key symbol filter 1105 filters out any common key symbols, which occur too frequently to be considered pertinent in interpreting the data set. The remaining key symbols, the "uncommon" key symbols, when sorted using sorter 925, can form a name for the group. The name might not necessarily be readable or understandable to a human, but the name is at least electronically distinguishable from other groups.

In the above description, the weighted magnitudes of the key symbols are determined relative only to the members of the group. But a person of ordinary skill in the art will recognize that the key symbols can be drawn from all members of the data set, not just those in the group. In that way, the weighted magnitude of the key symbols can be compared to the weighted magnitude of the key symbols as computed for other groups of members from the overall data set.

An example might prove useful to understanding how the weighted magnitudes of the key symbols are calculated. Consider the (arbitrary) data set consisting of six members shown in Table 3:

TABLE 3

| File name: | File contents: |
|---|---|
| F1 | red red red blue blue blue |
| F2 | blue blue blue yellow yellow yellow yellow |
| F3 | yellow yellow blue red red red |
| F4 | one one one one two two three |
| F5 | one one two two two two three |
| F6 | one one two two two three three three three three |

There are six key symbols in these six files: alphabetically, the symbols are "blue", "one", "red", "three" "two", and "yellow". (For purposes of understanding how embodiments of the invention operate to calculate weighted magnitudes for the key symbols, the fact that these key symbols are all relatively common is ignored.) These files can be grouped into two relevancy groups. Files F1, F2, and F3 form one relevancy group, and files F4, F5, and F6 form another relevancy group.

As can be seen, there are six key symbols in file F1. Three of these key symbols are "red", and three of these key symbols are "blue". Thus, "red" comprises 50% of the key symbols in file F1, and "blue" comprises 50% of the key symbols in file F1; the other symbols comprise 0% of the file. Thus, the digital essence vector for file F1 is <0.5, 0, 0.5, 0, 0, 0>. In a similar manner, digital essence vectors can be constructed for all six files; these digital essence vectors are shown in Table 4:

TABLE 4

| File name: | Digital essence vector: | | | | | |
|---|---|---|---|---|---|---|
| F1 | <0.5, | 0, | 0.5, | 0, | 0, | 0> |
| F2 | <0.43, | 0, | 0, | 0, | 0, | 0.57> |

TABLE 4-continued

| File name: | Digital essence vector: | | | | | |
|---|---|---|---|---|---|---|
| F3 | <0.17, | 0, | 0.5, | 0, | 0, | 0.33> |
| F4 | <0, | 0.57, | 0, | 0.14, | 0.29, | 0> |
| F5 | <0, | 0.29, | 0, | 0.14, | 0.57, | 0> |
| F6 | <0, | 0.18, | 0, | 0.55, | 0.27, | 0> |

Note that the digital essence vector for a given file is independent of the relevancy group that includes the file.

A cursory examination of Table 4 also shows that the maximum value for any key symbol is 0.57 (shared by "yellow" in file F2, "one" in file F4, and "two" in file F5). In general, the maximum value is determined relative to the files in the relevancy group for which the weighted magnitudes are being calculated. But in this example, the maximum value for any key symbol is the same in both relevancy groups. Thus, for purposes of this example, the term "maximum value" could be used without qualifying to the relevancy group.

Using the digital essence vectors as a vector in N-dimensional space, each vector representing its corresponding file, the distance between each pair of files can be calculated, using any desired distance metric. For example, Table 5 shows the distances between pairs of files measured using the Euclidean distance metric $$d(x, y) = d(y, x) = \sqrt{\sum_{i=1}^{n} (y_i - x_i)^2} :$$

TABLE 5

|  | F1: | F2: | F3: | F4: | F5: | F6: |
|---|---|---|---|---|---|---|
| F1: |  | 0.76 | 0.47 | 0.96 | 0.96 | 0.95 |
| F2: | 0.76 |  | 0.61 | 0.97 | 0.97 | 0.96 |
| F3: | 0.47 | 0.61 |  | 0.90 | 0.90 | 0.89 |
| F4: | 0.96 | 0.97 | 0.90 |  | 0.40 | 0.56 |
| F5: | 0.96 | 0.97 | 0.90 | 0.40 |  | 0.51 |
| F6: | 0.95 | 0.96 | 0.89 | 0.56 | 0.51 |  |

As can be seen in Table 5 the distance between vectors in N-dimensional space is symmetric: that is, the distance between files F1 and F2 does not depend on which file is the "starting point" for determining the distance between the files. (Compare this with the "nearest neighbor" relationship described above, which is not a symmetric relationship.) While the Euclidean distance metric is a well-known metric for measuring distance in N-dimensional space, a person of ordinary skill in the art will also recognize that other distance metrics can be used: for example, the taxicab geometry distance metric could be substituted for the Euclidean distance metric.

For each file, its nearest neighbor can be determined. As can be intuitively understood, for a given file f, the nearest neighbor of file f is the file that minimizes the distance between file f and that other file. For example, the nearest neighbor to file F1 is file F3, because the distance between files F1 and F3 (0.47 units) is less than the distance between file F1 and any other file. Table 6 shows the nearest neighbor for each of the six files:

TABLE 6

| File: | Nearest neighbor: |
|---|---|
| F1 | F3 |
| F2 | F3 |
| F3 | F1 |
| F4 | F5 |
| F5 | F4 |
| F6 | F5 |

Again, as noted previously, the nearest neighbor relationship is not a symmetric relationship: that is, the fact that a first file is nearest to a second file does not imply that the second file is nearest to the first file. For example, the nearest neighbor to file F2 is file F3, but the nearest neighbor to file F3 is file F1.

Table 6 also shows how the relevancy groups can be formed. Files F1 and F3 form a core group (as each is the other's nearest neighbor), with file F2 attached to this core group. Similarly, files F4 and F5 form a core group, with file F6 attached to this core group. Based on this nearest neighbor relationship, there is nothing that links these two relevancy groups.

Next, for each relevancy group, the magnitude of each key symbol can be calculated as the sum of all the values for that key symbol in the digital essence vectors for each file in the relevancy group, scaled by the maximum value for any key symbol in the relevancy group and the number of files in the relevancy group. Using "blue" as an example, "blue" has the values 0.5, 0.43, 0.17, 0, 0, and 0 in the six digital essence vectors; the first three values come from members of the first relevancy group, and the last three values come from members of the second relevancy group. Thus, the magnitude for the key symbol "blue" in the first relevancy group is (0.5+0.43+0.17)/(0.57*3)=1.1/1.71=0.64. But the magnitude for the key symbol "blue" in the second relevancy group is (0+0+0)/(0.57*3)=0/1.71=0. In a similar manner the magnitudes of the other key symbols can be calculated in each relevancy group. Table 7 and Table 8 show the magnitudes for the two relevancy groups.

The variation is calculated by summing the absolute value of the differences between the values for the key symbol in each pair of members in the relevancy group, scaled by the number of calculated differences. Thus, the variation for the key symbol "blue" in the first relevancy group is (|0.5−0.43|+|0.5−0.17|+|0.43−0.17|)/3=0.22, whereas the variation for the key symbol "blue" in the second relevancy group is (|0−0|+|0−0|+|0−0|)/3=0. In a similar manner the variations of the other key symbols can be calculated. Table 7 and Table 8 show the variations for the two relevancy groups.

The inverse variation is calculated by subtracting the variation from the maximum value for any key symbol in the relevancy group. Thus, the inverse variation for the key symbol "blue" in the first relevancy group is 0.57−0.22=0.35, and the inverse variation for the key symbol "blue" in the second relevancy group is 0.57−0=0.57. In a similar manner the inverse variations of the other key symbols can be calculated. Table 7 and Table 8 show the inverse variations for the two relevancy groups.

Finally, the weighted magnitude is calculated by multiplying the inverse variation by the magnitude. Thus, the weighted magnitude for the key symbol "blue" in the first relevancy group is 0.64*0.35=0.22, whereas the weighted magnitude for the key symbol "blue" in the second relevancy group is 0*0.57=0. In a similar manner the weighted magnitudes of the other key symbols can be calculated. Table 7 and Table 8 show the weighted magnitudes for the two relevancy groups.

TABLE 7

| Key symbol | Magnitude | Variation | Inverse variation | Weighted magnitude |
|---|---|---|---|---|
| "blue" | 0.64 | 0.22 | 0.35 | 0.22 |
| "one" | 0 | 0 | 0.57 | 0 |
| "red" | 0.58 | 0.33 | 0.24 | 0.14 |
| "three" | 0 | 0 | 0.57 | 0 |
| "two" | 0 | 0 | 0.57 | 0 |
| "yellow" | 0.53 | 0.38 | 0.19 | 0.10 |

TABLE 8

| Key symbol | Magnitude | Variation | Inverse variation | Weighted magnitude |
|---|---|---|---|---|
| "blue" | 0 | 0 | 0.57 | 0 |
| "one" | 0.61 | 0.26 | 0.31 | 0.19 |
| "red" | 0 | 0 | 0.57 | 0 |
| "three" | 0.49 | 0.27 | 0.3 | 0.15 |
| "two" | 0.66 | 0.2 | 0.37 | 0.24 |
| "yellow" | 0 | 0 | 0.57 | 0 |

The key symbols can now be sorted by their weighted magnitude, which shows their relative importance in each relevancy group. Thus, the sorted key symbols for the first relevancy group are "blue", "red", and "yellow"; the remaining key symbols are not relevant. Similarly, the sorted key symbols for the second relevancy group are "two", "one", and "three", with the other key symbols not relevant.

These results make intuitive sense, as "blue is found in all the files in the first relevancy group, whereas "red" and "yellow" are not. Similarly, "two" is found more frequently in the files in the second relevancy group than either "one" or "three".

By taking the key symbols in their sorted order, names can be constructed for the relevancy groups. Thus, the name for the first relevancy group can be "blue, red, yellow", whereas the name for the second relevancy group can be "two, one, three".

Figure 12:
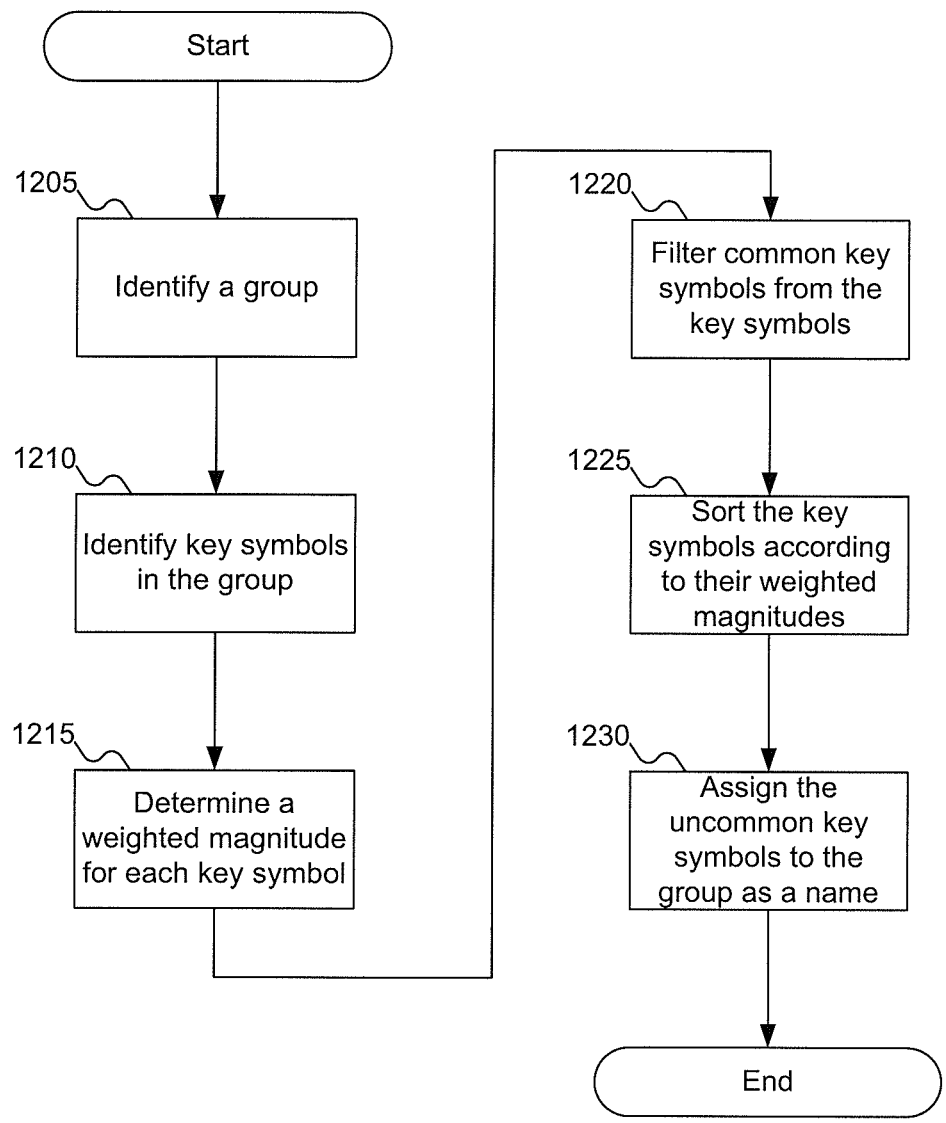
FIG. 12 shows a flowchart of a procedure to describe why members of a data set a related, according to an embodiment of the invention.

FIG. 12 shows a flowchart of a procedure to describe why members of a data set a related, according to an embodiment of the invention. In FIG. 12, at block 1205, the system identifies a group of members of data set. At block 1210, the system determines the key symbols in the members of the group. As discussed above, the system can actually determine the key symbols used in all members of the data set, and not just those members of the data set that are part of the group. At block 1215, the system determines a weighted magnitude for each key symbol.

At block 1220, the system filters out the common key symbols, leaving only the "uncommon" key symbols. At block 1225, the system sorts the key symbols according to their weighted magnitudes. At block 1230, the sorted uncommon key symbols are assigned as a name for the group.

Figure 13:
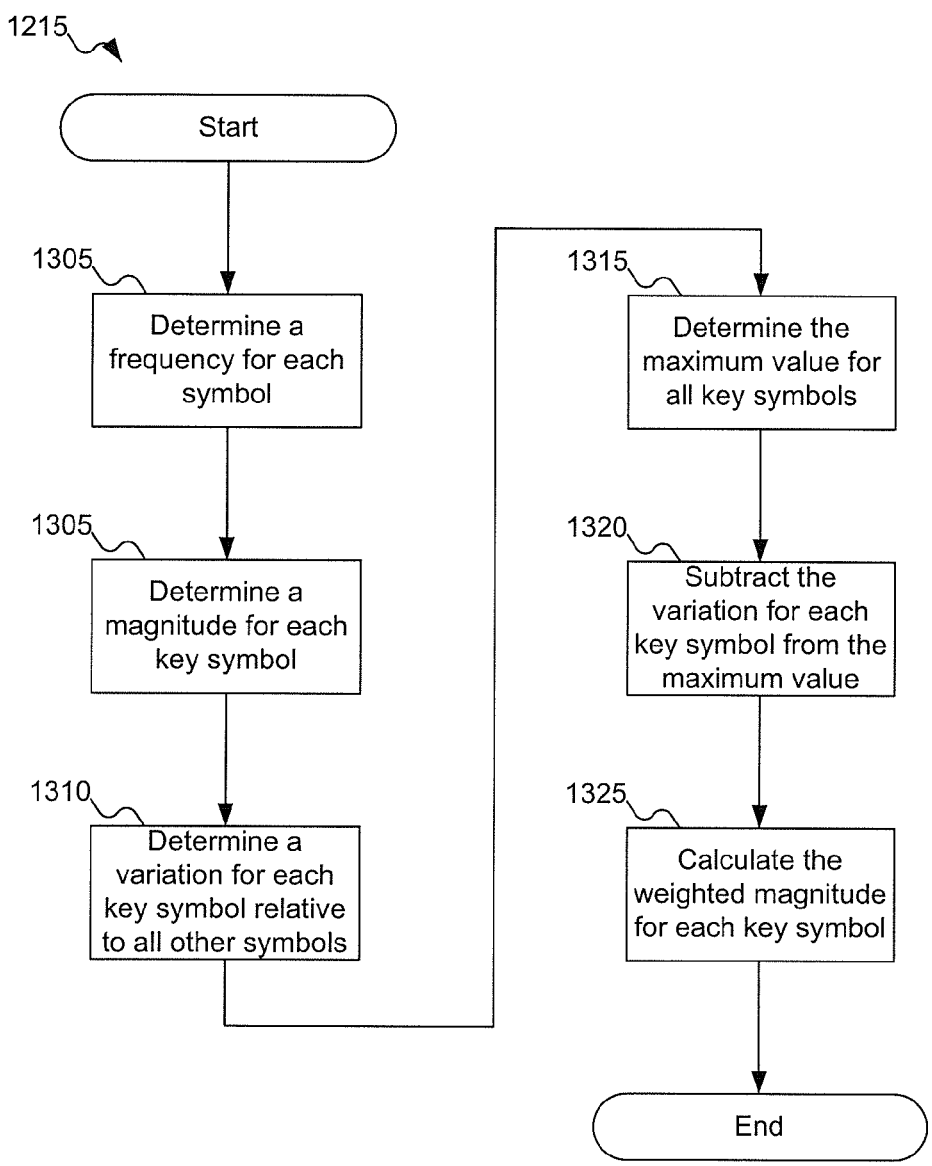
FIG. 13 shows a flowchart of a procedure to calculate the weighted magnitude for a key symbol, according to an embodiment of the invention.

FIG. 13 shows a flowchart of a procedure to calculate the weighted magnitude for a key symbol, according to an embodiment of the invention. In FIG. 13, at block 1405, the system determines a frequency for each symbol in each member of the group, relative to all other key symbols in the group. At block 1305, the system determines a magnitude for each key symbol. At block 1310, the system determines a variation for each key symbol.

At bock 1315, the system determines the maximum value for all key symbols in the relevancy group. At block 1320, the system determines the inverse variation for all key symbols. At block 1325, the system calculates the weighted magnitude for all key symbols.

Appendix A below includes source code programmed in the Java® programming language that implements an embodiment of the invention as described above in FIGS. 9-13. (Java is a registered trademark of Oracle America, Inc. and/or its affiliates.) A person of ordinary skill in the art will recognize that embodiments of the invention can be implemented in other programming languages, and that the source code shown in Appendix A is only one possible implementation using the Java programming language.

Although the flowcharts shows the blocks as being performed in a particular sequence, a person of ordinary skill in the art will recognize that the blocks can be rearranged into other logical sequences, which are considered parts of embodiments of the invention. In addition, various blocks can be omitted without comprising the functionality of embodiments of the invention. Finally, embodiments of the invention can be combined in any desired manner.

The following discussion is intended to provide a brief, general description of a suitable machine in which certain aspects of the invention can be implemented. Typically, the machine includes a system bus to which is attached processors, memory, e.g., random access memory (RAM), read-only memory (ROM), or other state preserving medium, storage devices, a video interface, and input/output interface ports. The machine can be controlled, at least in part, by input from conventional input devices, such as keyboards, mice, touch screens, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine can include embedded controllers, such as programmable or non-programmable logic devices or arrays, Application Specific Integrated Circuits, embedded computers, smart cards, and the like. The machine can utilize one or more connections to one or more remote machines, such as through a network interface, modem, or other communicative coupling. Machines can be interconnected by way of a physical and/or logical network, such as an intranet, the Internet, local area networks, wide area networks, etc. One skilled in the art will appreciate that network communication can utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention can be described by reference to or in conjunction with associated data including functions, procedures, data structures, application programs, instructions, etc. which, when accessed by a machine, result in the machine performing tasks or defining abstract data types or low-level hardware contexts. Associated data can be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, and other tangible, physical storage media. Associated data can also be delivered over transmission environments, including the physical and/or logical network, in the form of packets, serial data, parallel data, propagated signals, etc., and can be used in a compressed or encrypted format. Associated data can be used in a distributed environment, and stored locally and/or remotely for machine access.

Having described and illustrated the principles of the invention with reference to illustrated embodiments, it will be recognized that the illustrated embodiments can be modified in arrangement and detail without departing from such principles, and can be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms can reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as can come within the scope and spirit of the following claims and equivalents thereto.

APPENDIX A

```
public class FindGroupSymbolsText {
        public FindGroupSymbolsText(Logger logger) {
                super( );
                this.logger = logger;
                this.groupsFile = null;
        }
        public FindGroupSymbolsText(Logger logger, File groupFile) {
                super( );
                this.logger = logger;
                this.groupsFile = groupFile;
        }
        String className = "FindGroupSymbolsText";
        Logger logger = null;
        File groupsFile = null;
        File devsDir = null;
        File keyFile = null;
        File symbolsFile = null;
        public int parseIt(String[ ] args) {
                int retval = ResourcesText.SUCCESS;
                int ec = ResourcesText.SUCCESS;
                /// check and make sure not already set
                if (this.groupsFile != null) {
                        logger.warn(className + ": interface called with parameters already set.");
                        return retval;
                }
                String usage = "--groups <groupsFile>";
                CliOptions ap = new CliOptions(logger, className, usage);
                ec = ap.parseIt(args);
                if (ec != ResourcesText.SUCCESS) {
                        retval = ec;
                        return retval;
                }
                ec = ap.CheckGroupsFileRead( );
                if (ec != ResourcesText.SUCCESS) {
                        retval = ec;
                        return retval;
                }
                groupsFile = ap.groupsFile;
                return retval;
        }
    public int doIt( ) {
        int retval = ResourcesText.SUCCESS;
        String s = null;
        int files_size = -1;
        int devs_size = -1;
           BufferedReader onedevBuffer = null;
           BufferedReader keyBuffer = null;
           String line = null;
           String[ ] list = null;
           int devs_i = 0;
           int devs_j = 0;
           int files_i = 0;
           int files_j = 0;
        String[ ] syms = null;
        float devs[ ][ ] = null;
        String fileName = null;
        File file = null;
        File devsDir = null;
                float[ ] devs_diff = null;
                float[ ] devs_sorted = null;
```

APPENDIX A-continued

```
            int[ ] syms_sorted = null;
            boolean[ ] devs_marked = null;
            int size = 0;
            int groupCount = 0;
            int groupTotal = 0;
            int groupSize = 0;
    int fileCount = 0;
    String groupName = null;
    String parent = null;
    BufferedReader in = null;
        FileReader fr = null;
    float avg = 0.0f;
    long start_time = 0;
    long stop_time = 0;
    float elapsed_time_this = 0;
    float elapsed_time_all = 0;
    float time_left = 0;
    float total_time = 0;
    // given the groups path, X/groups, create a devsDir path = X/devs
    parent = groupsFile.getParent( );
    if (parent == null) {
                s = String.format("null groups file parent");
                logger.warn(s);
                retval = ResourcesText.ERROR_OTHER_GENERAL_VAL;
                return retval;
    }
    devsDir = new File(parent + File.separator +
CommonStrings.DevsDirectoryString);
    if (!devsDir.exists( )) {
                s = String.format("devs dir does not exist: %s",
devsDir.toString( ));
                logger.warn(s);
                retval = ResourcesText.ERROR_OTHER_GENERAL_VAL;
                return retval;
    }
    if (!devsDir.canRead( )) {
                s = String.format("devs dir does not be read: %s",
devsDir.toString( ));
                logger.warn(s);
                retval = ResourcesText.ERROR_OTHER_GENERAL_VAL;
                return retval;
    }
    keyFile = new File(parent + File.separator +
CommonStrings.KeyFileString);
    if (!keyFile.exists( )) {
                s = String.format("key file does not exist: %s",
keyFile.toString( ));
                logger.warn(s);
                retval = ResourcesText.ERROR_OTHER_GENERAL_VAL;
                return retval;
    }
    if (!keyFile.canRead( )) {
                s = String.format("key file does not be read: %s",
keyFile.toString( ));
                logger.warn(s);
                retval = ResourcesText.ERROR_OTHER_GENERAL_VAL;
                return retval;
    }
        // read the keys files
        s = String.format("reading key: %s", keyFile.toString( ));
    logger.trace(s);
    try {
            keyBuffer = new BufferedReader(new InputStreamReader(new
FileInputStream(keyFile), "UTF-8"));
            line = null;
            line = keyBuffer.readLine( );
            if (line == null) {
                s = String.format("exiting: cant read key size for file
%s", keyFile.getName( ));
                logger.error(s);
                retval = ResourcesText.ERROR_OTHER_GENERAL_VAL;
                return retval;
```

APPENDIX A-continued

```
            }
            size = Integer.parseInt(line);
            devs_size = size;
            syms = new String[devs_size];
            KeyEntry ke = null;
            for (devs_i = 0; devs_i < devs_size; devs_i++) {
                    line = keyBuffer.readLine( );
                    if (line == null) {
                            s = String.format("exiting: cant read symbold %d for
file %s", devs_i, keyFile.getName( ));
                            logger.error(s);
                            retval = ResourcesText.ERROR_OTHER_GENERAL_VAL;
                            return retval;
                    }
                    ke = new KeyEntry(line);
                    syms[devs_i] = ke.val;
            }
        } catch (IOException e) {
                s = String.format(ResourcesText.ERROR_OTHER_EXCEPTION_STR,
e.getMessage( ));
                        logger.error(s, e);
                retval = ResourcesText.ERROR_OTHER_GENERAL_VAL;
                        return retval;
        } finally {
            if (keyBuffer != null) {
                    try {
                       keyBuffer.close( );
                    } catch (IOException e4) {
                            s =
String.format(ResourcesText.ERROR_OTHER_EXCEPTION_STR, e4.getMessage( ));
                                    logger.error(s, e4);
                    }
            }
        }
        devs_diff = new float[devs_size];
        devs_sorted = new float[devs_size];
        syms_sorted = new int[devs_size];
        devs_marked = new boolean[devs_size];
   // Read the groups file to get the total count of groups
        in = null;
        fr = null;
        JSONGroupsRelative grps = null;
        try {
             String jsonstr = HelperMethods.readFileAsString(groupsFile);
             if (jsonstr == null) throw new Exception("groupsFile is empty");
             grps = new JSONGroupsRelative( );
             grps.DeserializeFromJson(new JSONObject(jsonstr));
             groupSize = grps.groups.size( );
             fileCount = 0;
             for(int i = 0; i<groupSize; i++) {
                     fileCount += grps.groups.get(i).uuids.length( );
             }
        } catch (JSONException je) {
                    s = String.format("JSONException: %s", je.toString( ));
                    logger.error(s);
                retval = ResourcesText.ERROR_OTHER_GENERAL_VAL;
                    return retval;
        } catch (Exception e) {
                    s = String.format("IOException: %s", e.toString( ));
                    logger.error(s);
                retval = ResourcesText.ERROR_OTHER_GENERAL_VAL;
                    return retval;
        }
                groupTotal = groupSize;
   // For each group in the groups file
        // read the group name and get the list of files for that group
(see GetGroups code)
            // read in the DEVs for each file in that group
            // figure out the symbols
            // write the symbols to "group_symbols_<groupName>
```

APPENDIX A-continued

```
            in = null;
            fr = null;
            avg = 0.0f;
        elapsed_time_all = 0;
        groupCount = 0;
            try {
                                for (int grpidx=0; grpidx<groupTotal; grpidx++) {
                                    /*
*************************************************************************
*************************************************************************
*************************************************************************
                                    *
                                    * Start a new group
                                    *
*************************************************************************
*************************************************************************
*************************************************************************
                                    */
                                    start_time = System.currentTimeMillis( );
                                    groupSize = grps.groups.get(grpidx).uuids.length( );
                                    groupName = grps.groups.get(grpidx).name;
                                    list = new String[groupSize];
                                    fileCount = 0;
                                    if (logger.isTraceEnabled( )) {
                                        s = String.format("Starting to work on a new group: %s, %d", groupName, groupSize);
                                        logger.trace(s);
                                    }
                                    symbolsFile = new File(parent + File.separator + CommonStrings.GroupSymbolsFileString + groupName);
                                    for (int uid = 0; uid<groupSize; uid++) {
                                        try {
                                            list[fileCount++] = grps.groups.get(grpidx).uuids.getString(uid);
                                        } catch (JSONException je) { }
                                    }
                                    // We are done reading the group with its name and size and all of its members
                                    // now we need to find the symbols for that group
                                    try {
                                        files_size = list.length;
                                        devs = new float[files_size][devs_size];
                                        for (files_i = 0; files_i < files_size; files_i++) {
                                            fileName = devsDir + File.separator + list[files_i];
                                            if (logger.isTraceEnabled( ))
                                            {
                                                s = String.format("reading dev file = \"%s\"", fileName);
                                                logger.trace(s);
                                            }
                                            file = new File(fileName);
                                            if (!file.exists( )) {
                                                s = String.format("exiting: file \"%s\" does not exist", file.getName( ));
                                                logger.fatal(s);
                                                retval = ResourcesText.ERROR_OTHER_GENERAL_VAL;
                                                return retval;
                                            }
                                            if (!file.canRead( )) {
                                                s = String.format("exiting: file \"%s\" can not be read", file.getName( ));
                                                logger.error(s);
                                                retval = ResourcesText.ERROR_OTHER_GENERAL_VAL;
                                                return retval;
                                            }
                                            onedevBuffer = new BufferedReader(new InputStreamReader(new FileInputStream(file), "UTF-8"));
                                            line = null;
                                            line =
```

APPENDIX A-continued

```
onedevBuffer.readLine( );
                                            if (line == null) {
                                                    s =
String.format("exiting: can't read dev size for file \"%s\"",
file.getName( ));
                                                    logger.error(s);
                                                    retval =
ResourcesText.ERROR_OTHER_GENERAL_VAL;
                                                    return retval;
                                            }
                                            size =
Integer.parseInt(line);
                                            if (devs_size != size) {
                                                    s =
String.format("exiting: this dev size %d does not match the other dev sizes
%d for file %s", size, devs_size, file.getName( ));
                                                    logger.error(s);
                                                    retval =
ResourcesText.ERROR_OTHER_GENERAL_VAL;
                                                    return retval;
                                            }
                                            for (devs_i = 0; devs_i <
devs_size; devs_i++) {
                                                    line =
onedevBuffer.readLine( );
                                                    if (line == null) {
                                                            s =
String.format("exiting: cant read dev value %d for file %s", devs_i,
file.getName( ));
                                                            logger.error(s);
                                                            retval =
ResourcesText.ERROR_OTHER_GENERAL_VAL;
                                                            return retval;
                                                    }
                                                    devs[files_i][devs_i] =
Float.parseFloat(line);
                                            }
                                            try {
                                                    onedevBuffer.close( );
                                            } catch (IOException e4) {
                                                    s =
String.format("error while closing BufferedReader for file = %s, message =
%s", fileName, e4.getMessage( ));
                                                    logger.error(s,
e4);
                                            }
                                    }
                                    s =
String.format("preparing to sort");
                                    logger.trace(s);
                                    float maxDev = 0.0f;
                                    for (files_i = 0; files_i <
files_size; files_i++) {
                                            for (devs_i = 0;
devs_i < devs_size; devs_i++) {
                                                    if
(devs[files_i][devs_i] > maxDev) {
                                                            maxDev =
devs[files_i][devs_i];
                                                    }
                                            }
                                    }
                                    int it_count = (
(files_size) * (files_size −1) ) / 2;
                                    for (devs_i = 0; devs_i <
                                    devs_size; devs_i++) {
                                            devs_diff[devs_i] =
0.0f;
                                            for (files_i = 0;
files_i < files_size; files_i++){
                                                    devs_diff[devs_i] =
devs_diff[devs_i] + devs[files_i][devs_i];
                                            }
                                            devs_diff[devs_i] =
devs_diff[devs_i] / ( maxDev * files_size);     // VAL_1
                                            devs_marked[devs_i] =
false;
                                            syms_sorted[devs_i] =
−1;
                                    }
```

APPENDIX A-continued

```
devs_size; devs_i++) { files_size; files_i++) { files_i+1; files_j < files_size; files_j++) {

Math.abs(devs[files_i][devs_i] – devs[files_j][devs_i]);
        }
    }
    maxDev);

String.format(className + ": val is > 1.0f, val for devs_i %d is %–15.14f",
    devs_i, val);
        logger.error(s);

devs_diff[devs_i] * val;                    // VAL_4
    might not be a number or it might be infinite
    make it a 0.0f since a 1.0f is "very relative" and a 0.0f is "very not
    relative"

Float.isNaN(devs_diff[devs_i]) || Float.isInfinite(devs_diff[devs_i])) {
        devs_diff[devs_i] = 0.0f;

(longger.isTraceEnabled( )) {

String.format("sorting symbols");

devs_sorted and syms_sorted devs_size; devs_i++) { devs_size; devs_j++) { thisMax && devs_marked[devs_j] == false) { devs_j;

devs_diff[devs_j];

System.err.println(className + ": bad thisSym on devs_i == " +
    devs_i);
    6);

thisSym;

true;

devs_diff[thisSym];

object and then write content to disk
        float val = 0.0f;
        for (devs_i = 0; devs_i <
            val = 0.0f;
            for (files_i = 0; files_i <
                for (files_j =
                    val = val +
                }
            }
            val = val / (it_count *
            if (val > 1.0f) {
                s =

System.exit(–2);
            }
            val = val * maxDev;
                        // VAL_2
            val = maxDev – val;
                        // VAL_3
            devs_diff[devs_i] =
                                        // devs_diff[devs_i]
                                        // if so, then let's
            if (
            }
        }
        if
            s =
            logger.trace(s);
        }
        int thisSym = –1;
        float thisMax = 0.0f;
        // now sort devs_diff into
        for (devs_i = 0; devs_i <
            thisSym = –1;
            thisMax = 0.0f;
            for (devs_j = 0; devs_j <
                if (devs_diff[devs_j] >=
                    thisSym =
                    thisMax =
                }
            }
            if (thisSym == –1) {
                System.exit(–
            }
            syms_sorted[devs_i] =
            devs_marked[thisSym] =
            devs_sorted[devs_i] =
        }
        /*
         * Build JSON Symbols
         */
        JSONSymbols symT = null;
        JSONSymbol symE = null;
```

APPENDIX A-continued

```
                                symT = new JSONSymbols( );
                                for (devs_i = 0; devs_i <
devs_size; devs_i++) {
                                    if
(devs_sorted[devs_i] > 0.0f) {
                                        symE = new
JSONSymbol(syms[syms_sorted[devs_i]], devs_sorted[devs_i]);
        symT.symbols.add(symE);
                                    }
                                }
                                String errmsg =
HelperMethods.writeFileAsString(symbolsFile,
symT.SerializeToJson( ).toString( ));
                                if (errmsg != null) {
                                    s = String.format("exiting:
can't write file %s", symbolsFile.getName( ));
                                    logger.error(s);
                                    retval =
ResourcesText.ERROR_OTHER_GENERAL_VAL;
                                    return retval;
                                }
                            } catch (JSONException je){
                                s =
String.format(ResourcesText.ERROR_OTHER_EXCEPTION_STR, je.getMessage( ));
                                logger.error(s, je);
                                retval =
ResourcesText.ERROR_OTHER_GENERAL_VAL;
                                return retval;
                            } catch (IOException e3) {
                                s =
String.format(ResourcesText.ERROR_OTHER_EXCEPTION_STR, e3.getMessage( ));
                                logger.error(s, e3);
                                retval =
ResourcesText.ERROR_OTHER_GENERAL_VAL;
                                return retval;
                            } finally {
                                if (onedevBuffer != null) {
                                    try {
                                        onedevEuffer.close( );
                                    } catch (IOException e6) {
                                        s =
String.format(ResourcesText.ERROR_OTHER_EXCEPTION_STR, e6.getMessage( ));
                                        logger.error(s,
e6);
                                    }
                                }
                            }
                            /*
************************************************************************
************************************************************************
************************************************************************
                             *
                             * End this group
                             *
************************************************************************
************************************************************************
************************************************************************
                             */
                            stop_time = System.currentTimeMillis( );
                            elapsed_time_this = (stop_time -
start_time) / 1000.0f;
                            avg = ((avg * (groupCount)) +
elapsed_time_this) / (groupCount + 1);
                            elapsed_time_all = elapsed_time_all +
elapsed_time_this;
                            time_left = avg * (groupTotal -
(groupCount + 1));
                            total_time = elapsed_time_all +
time_left;
                            if ((groupCount % 5) == 0) {
                                if (logger.isInfoEnabled( ))
{
                                    s =
String.format(ResourcesText.OTHER_ROUNDFORMAT_STR,
Math.round(elapsed_time_all), Math.round(time_left),
Math.round(total_time));
                                    logger.info(s);
                                }
                            }
                            // We are done with this group, lets
```

APPENDIX A-continued

```
see if there are more groups
                                        groupCount++;
                    }
                } finally {
                    if (in != null) {
                        try {
                            in.close( );
                        } catch (IOException e1) {
                        }
                    }
                    if (fr != null) {
                        try {
                            fr.close( );
                        } catch (IOException e2) {
                        }
                    }
                }
                if (logger.isTraceEnabled( )) {
                    logger.trace("read groups file: " +
groupsFile.toString( ));
                }
            return retval;
        }
        /**
         * @param args
         */
        public static void main(String[ ] args) {
            String logProperties = null;
            if (HelperMethods.IsPlatform(CommonStrings.platformLinux)) {
                logProperties = CommonStrings.LogPropertiesFileLinux;
            } else {
                logProperties = CommonStrings.LogPropertiesFileWin;
            }
            Logger logger =
Logger.getLogger(CommonStrings.ServerLoggerName);
            PropertyConfigurator.configure(logProperties);
            FindGroupSymbolsText g = new FindGroupSymbolsText(logger);
            int ec = ResourcesText.SUCCESS;
            g.logger.info("starting");
            g.logger.info("parsing");
            ec = g.parseIt(args);
            if (ec != ResourcesText.SUCCESS) {
                g.logger.info("exiting: " + ec);
                System.exit(ec);
            }
            g.logger.info("processing");
            ec = g.doIt( );
            if (ec != ResourcesText.SUCCESS) {
                g.logger.info("exiting: " + ec);
                System.exit(ec);
            }
            g.logger.info("exiting: SUCCESS");
        }
}
```

The invention claimed is:

1. An apparatus, comprising:
   a machine;
   an input port to receive a description of relationships among a plurality of members of a data set and to receive a query;
   a graph constructor to construct a graph representing said relationships among said plurality of members of said data set; and
   a query results module to use said graph representing said relationships among said plurality of members of said data set to group together possible results of said query and the query results module produces query results and identifies a particular data set to which a best member for responding to the query belongs, the best member includes a best member identifier and a group identifier that identifies a particular group to which the best member belongs, the particular group including particular members that are positioned as more responsive to the query than other members of the data set belonging to other groups and the particular group is given a strength that includes its order, weight, and distance compared to other groups, the order includes a total number of nodes in that particular group, the weight is a depth of a deepest sub-tree in that particular group, and the distance is a geometric average from each node within the particular group to that node's nearest neighboring node within the particular group.

2. An apparatus according to claim 1, wherein the graph constructor is configured to identify, for each member of said data set, a nearest neighbor of that member of said data set.

3. An apparatus according to claim 1, wherein the graph constructor is configured to allocate each member of said data set to a group.

4. An apparatus according to claim 3, wherein the query results module includes:
   the best member identifier to identify a member of said data set that best satisfies said query;

the group identifier to identify a group to which said member of said data set that best satisfies said query belongs; and the query results module is configured to return said member of said data set that best satisfies the query and at least one other member of said group to which said member of said data set that best satisfies said query belongs.

5. An apparatus according to claim 4, wherein the query results module is configured to return said at least one other member of said group to which said member of said data set that best satisfies said query belongs sorted by a distance between said at least one other member and said member of said data set that best satisfies said query.

6. An apparatus according to claim 3, further comprising a group balance determiner to determine whether said group is balanced.

7. An apparatus according to claim 6, further comprising a heavy sub-tree splitter to determine that a heavy sub-tree of said group includes a threshold percentage of a total number of nodes in said group and to split said heavy sub-tree off said core of said group.

8. A method for organizing data, comprising:
   using a processor, identifying a plurality of members of a data set;
   identifying relationships among the plurality of members of the data set from the plurality of members of the data set; and
   constructing a graph representing the relationships among the plurality of members of the data set and producing results for a particular query that identifies a particular data set having a particular member that best satisfies the particular query the particular member includes a best member identifier and a group identifier that identifies a particular group to which the particular member belongs, the particular group including particular members that are positioned as more responsive to the particular query than other members of the data set belonging to other groups and the particular group is given a strength that includes its order, weight, and distance compared to other groups, the order includes a total number of nodes in that particular group, the weight is a depth of a deepest sub-tree in that particular group, and the distance is a geometric average from each node within the particular group to that node's nearest neighboring node within the particular group.

9. A method according to claim 8, further comprising using the graph representing the relationships among the plurality of members of the data set to identify possible results of a query.

10. A method according to claim 9, wherein identifying relationships among the plurality of members of the data set includes identifying, for each member of the data set, a nearest neighbor of that member of the data set.

11. A method according to claim 10, wherein identifying, for each member of the data set, another member of the data set that is its nearest neighbor includes identifying, for each member of the data set, the distance between that member of the data set and its nearest neighbor.

12. A method according to claim 9, wherein constructing a graph representing the relationships among the plurality of members of the data set includes allocating each member of the data set to a group.

13. An article comprising a non-transitory storage medium, said non-transitory storage medium having stored thereon instructions, that, when executed by a machine, result in:
   using a processor, identifying a plurality of members of a data set;
   identifying relationships among the plurality of members of the data set from the plurality of members of the data set; and
   constructing a graph representing the relationships among the plurality of members of the data set and producing results for a particular query that identifies a particular data set having a particular member that best satisfies the particular query, the particular member includes a best member identifier and a group identifier that identifies a particular group to which the particular member belongs, the particular group including particular members that are positioned as more responsive to the particular query than other members of the data set belonging to other groups and the particular group is given a strength that includes its order, weight, and distance compared to other groups, the order includes a total number of nodes in that particular group, the weight is a depth of a deepest sub-tree in that particular group, and the distance is a geometric average from each node within the particular group to that node's nearest neighboring node within the particular group.

14. An article according to claim 13, said non-transitory storage medium having stored thereon further instructions, that, when executed by the machine, result in using the graph representing the relationships among the plurality of members of the data set to identify possible results of a query.

15. An article according to claim 14, wherein identifying relationships among the plurality of members of the data set includes identifying, for each member of the data set, a nearest neighbor of that member of the data set.

16. An article according to claim 14, wherein constructing a graph representing the relationships among the plurality of members of the data set includes allocating each member of the data set to a group.

* * * * *